United States Patent

Lancaster et al.

[11] Patent Number: 5,993,117
[45] Date of Patent: Nov. 30, 1999

[54] ICE TRANSPORTATION SYSTEM AND METHOD

[75] Inventors: William G. Lancaster, Louisville, Ky.; Jerry L. Landers, Sellersburg, Ind.; Richard K. Renken, Chesterfield, Mo.; William L. Ramser, Sellersburg; Matthew J. Ramser, New Albany, both of Ind.

[73] Assignee: Servend International, Inc., Sellersburg, Ind.

[21] Appl. No.: 08/789,980

[22] Filed: Jan. 28, 1997

Related U.S. Application Data

[60] Provisional application No. 60/010,785, Jan. 29, 1996.

[51] Int. Cl.⁶ .................................................. B65G 53/08
[52] U.S. Cl. ................................ 406/3; 406/32; 406/133; 406/156
[58] Field of Search .................................. 406/3, 32, 50, 406/133, 156

[56] References Cited

U.S. PATENT DOCUMENTS

| | | |
|---|---|---|
| 1,308,464 | 7/1919 | Westly . |
| 2,015,959 | 10/1935 | Needham . |
| 3,380,780 | 4/1968 | Allen et al. . |
| 3,858,943 | 1/1975 | Bose et al. . |
| 3,877,241 | 4/1975 | Wade . |
| 3,881,642 | 5/1975 | Hoenisch . |
| 3,930,377 | 1/1976 | Utter . |
| 4,104,889 | 8/1978 | Hoenisch . |
| 4,158,426 | 6/1979 | Frohbieter . |
| 4,775,267 | 10/1988 | Yamamoto . |
| 4,856,941 | 8/1989 | Morimoto et al. . |
| 4,904,127 | 2/1990 | Morimoto et al. . |
| 4,904,128 | 2/1990 | Morimoto et al. . |
| 4,930,685 | 6/1990 | Landers . |
| 5,056,962 | 10/1991 | Morimoto et al. . |
| 5,150,990 | 9/1992 | Morimoto et al. . |
| 5,154,545 | 10/1992 | Morimoto et al. . |
| 5,181,806 | 1/1993 | Grosswiller et al. . |
| 5,299,891 | 4/1994 | Grosswiller et al. . |
| 5,304,017 | 4/1994 | Vogel et al. . |
| 5,354,152 | 10/1994 | Reinhardt et al. . |
| 5,525,015 | 6/1996 | Morimoto et al. ........................ 406/50 |
| 5,549,421 | 8/1996 | Reinhardt et al. . |
| 5,660,506 | 8/1997 | Berge et al. ............................... 406/3 |

FOREIGN PATENT DOCUMENTS

| | | |
|---|---|---|
| 384317A1 | 6/1990 | Germany . |
| 2-163216 | 6/1990 | Japan . |
| 1400989A1 | 6/1988 | U.S.S.R. . |
| 2116284A | 9/1983 | United Kingdom . |

*Primary Examiner*—Gary C. Hoge
*Attorney, Agent, or Firm*—King and Schickli

[57] ABSTRACT

A system for transporting ice pieces or the like from a primary bin to one or more satellite bins is disclosed. A dispenser forms a charge of ice pieces in a precharge chamber, which is then transferred by air assist to a delivery tube. A driver member is provided to engage and move the substantially defined charge of ice pieces to the selected satellite bin. The driver member is propelled by a differential pressure within the tube. This permits the defined charge to be exposed only to the low pressure side and insulated from the high pressure propelling medium to minimize breakage and melting during delivery. Before reaching the satellite bin, the piston is reversed to shuttle back to the home position. The satellite bins are connected in series and delivery of a charge to an intermediate bin is provided by moving a tube section out of alignment with the delivery tube. Lubrication and continuous cleaning is performed by the driver member sweeping minimal residual water from melting ice. A full, two phase cleaning cycle is also provided by injecting cleaning fluid/rinse water into the tube for delivery by the piston. Single or dual fans are used to provide the differential pressure. A controller coordinates the system operation and allows monitoring and adjustment of all parameters.

23 Claims, 9 Drawing Sheets

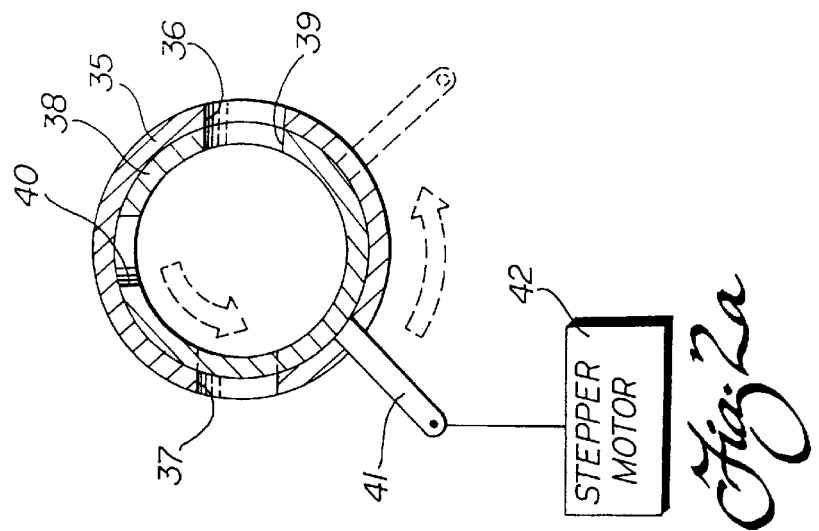
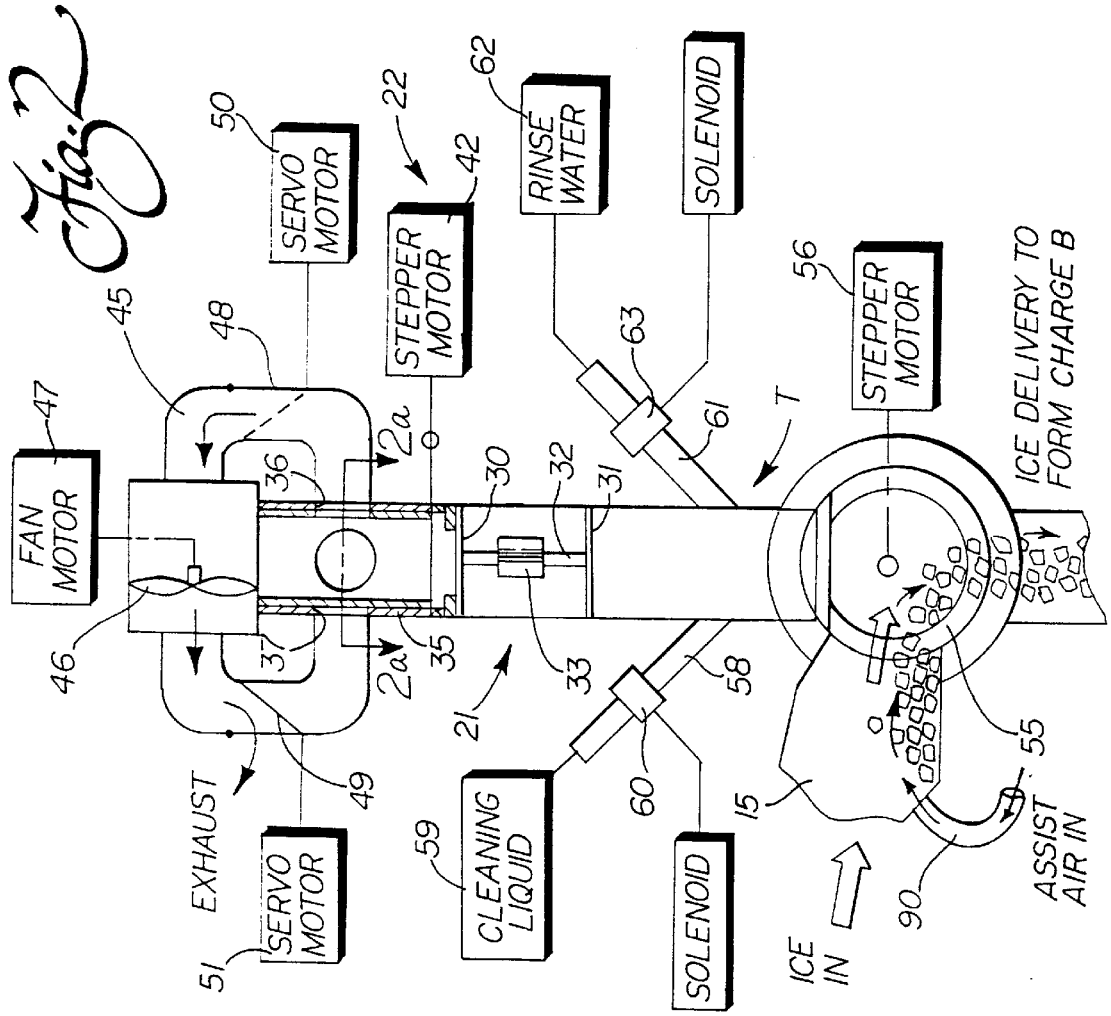

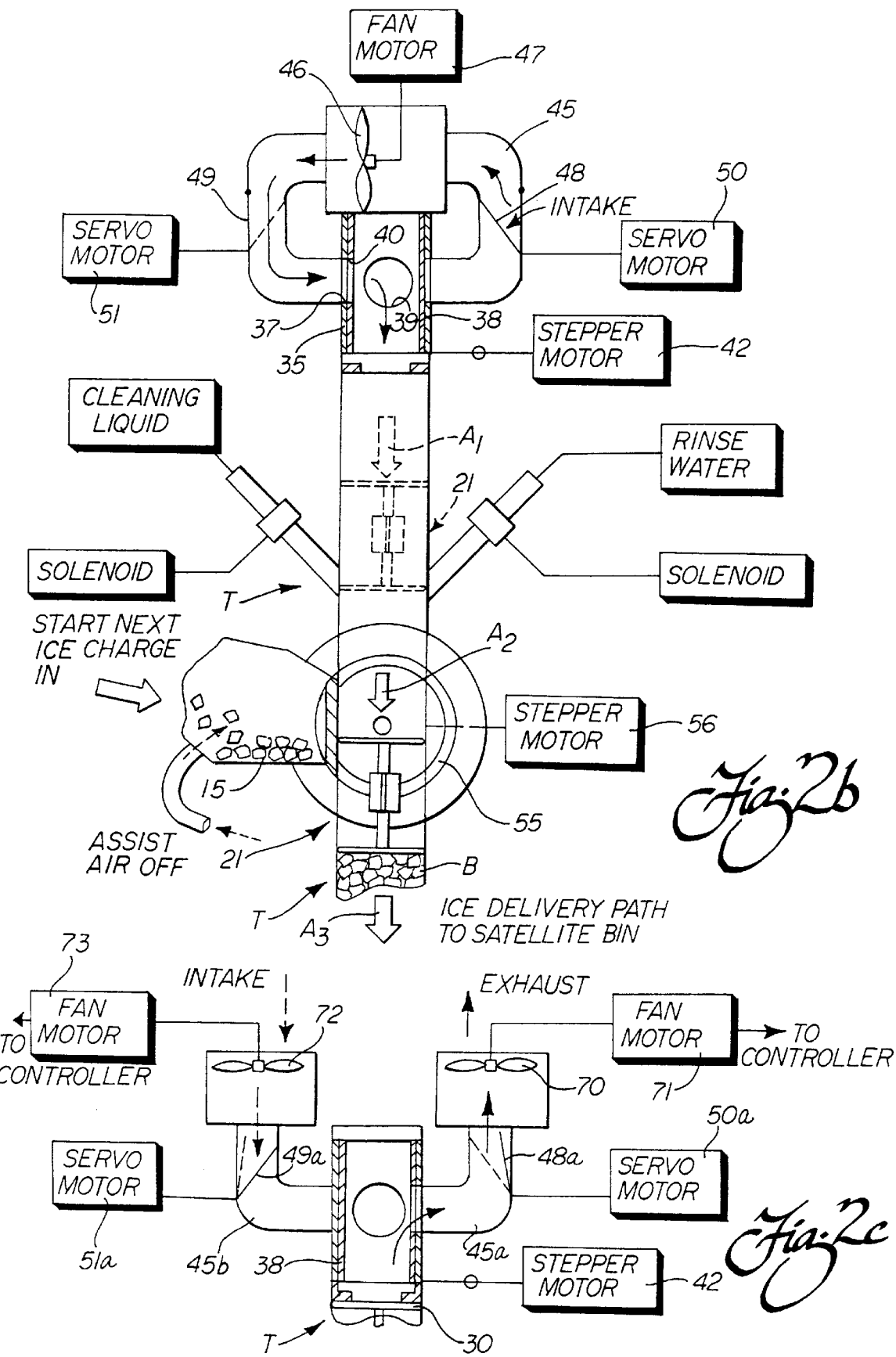

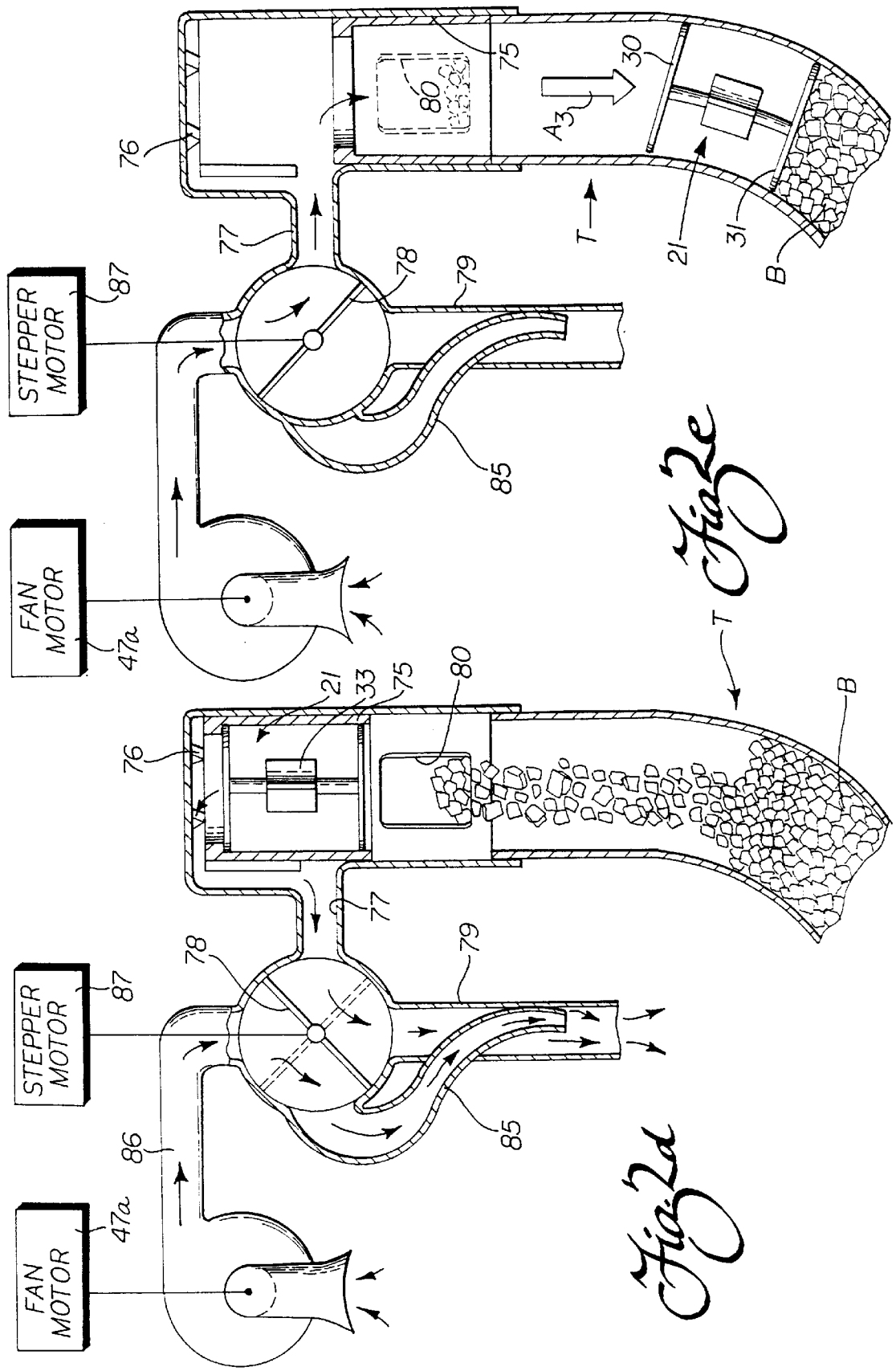

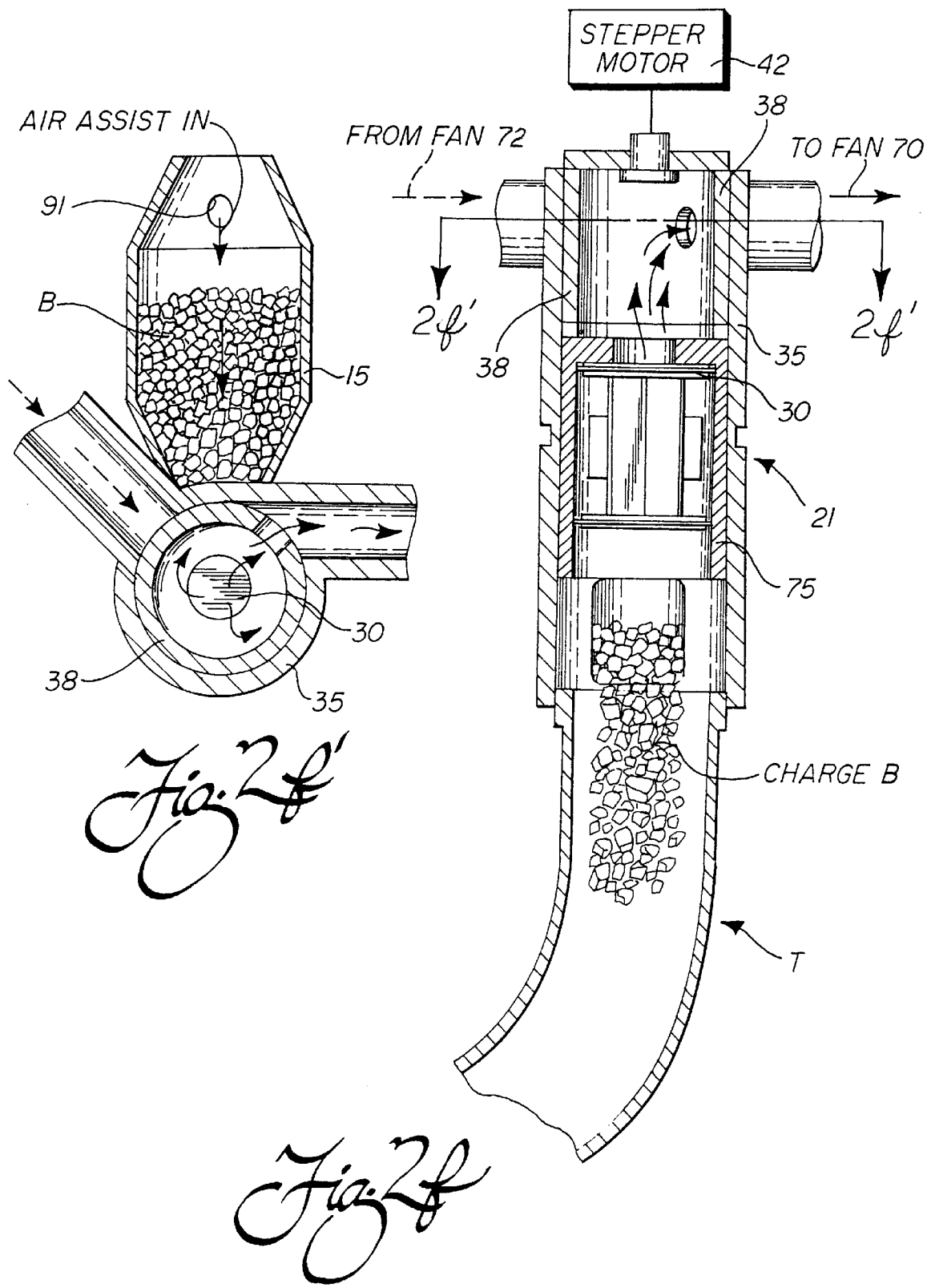

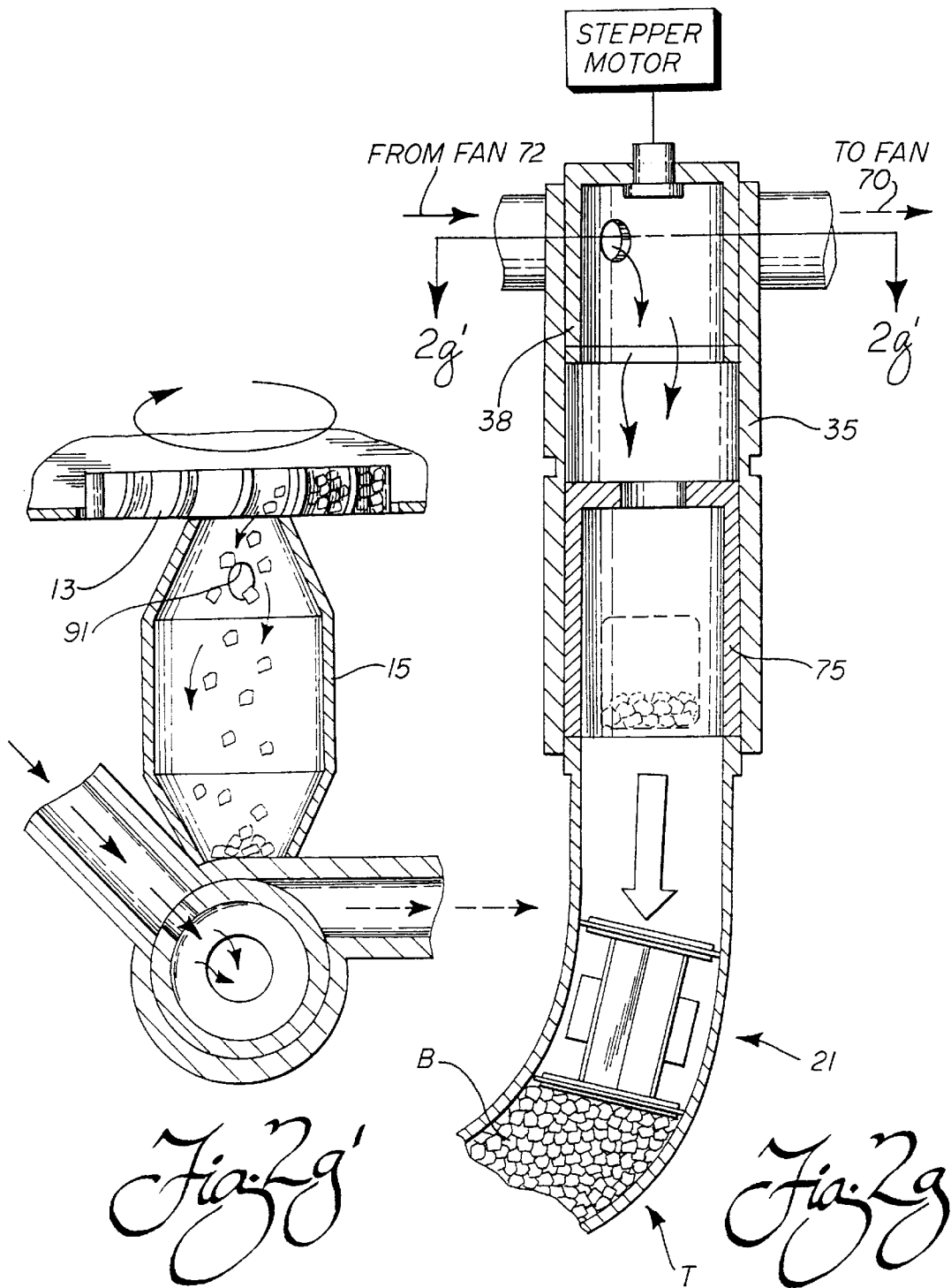

ICE TRANSPORTATION SYSTEM AND METHOD

Priority is provided by U.S. Provisional patent application Ser. No. 60/010,785, filed Jan. 29, 1996, entitled, "Ice Distribution System and Method".

BACKGROUND OF THE INVENTION

The present invention relates to a distribution or transportation system for delivering ice cubes or pieces in batch or charge form along a delivery or transport tube to one or more satellite bins for dispensing ice and/or an iced beverage for use, and more particularly, to such a system wherein an insulating driver member, preferably in the form of a piston, engages the batch and upon being propelled delivers the batch to the satellite bin(s) in an efficient and rapid manner.

The use of self-service ice and iced beverage dispensers is becoming more and more popular, especially in fast food restaurants. In general, a dispensing machine is conveniently located in the dining area of the restaurant and has a bin for containing several pounds of ice at one time. The ice is dispensed by the customer holding a cup under a delivery chute to activate a rotating wheel with paddles that lift the ice and deposit the desired number of cubes into the cup. Next, the cup is placed under a selected beverage nozzle and a valve actuated to add the flavored beverage or water.

At present, the most common manner of filling the bin with the ice cubes is simply through a manual operation of dumping ice into the machine from a large bucket. It has also been suggested to provide an ice maker on top of each of the dispensing machines to keep the bin filled with ice cubes. While this system works well in some installations, it has been found that for a reasonably sized ice maker that can be placed on the dispenser, the ice making capacity is not sufficient to keep up at times of high demand. Also, it is a relatively costly alternative due to the high cost of the ice maker.

An example of a highly successful ice dispenser that is used in the industry is shown in Applicant's own prior U.S. Pat. No. 4,930,685, issued on Jun. 5, 1990.

There has also been a suggestion to overcome the shortcomings of the manual filling procedure, or the use of a ice maker on the dispensing machine, by using a high capacity, central ice maker located in the kitchen area of the restaurant and delivering ice through a tubular distribution system to satellite dispensers. One of the first known systems of this kind utilized a water carrier in which the ice cubes were suspended; the water/ice suspension being pumped from the central location to the satellite dispenser machine. The ice cubes are separated at the dispenser, with the water being dumped, or returned in a loop to pick up more ice and repeat the delivery cycle.

A later modification of this prior system had to do with the use of air as the carrier for moving the ice through the delivery tube. Generally, this pneumatic system is believed by most to be an improvement. However, in either system, there was a major drawback due to breakage and melting of the ice cubes during transport of the ice to the dispensers. Indeed, in some of the prior systems, up to 40% of the ice is determined to be lost during transit.

A later system attempted to modify the pressurized air distribution system wherein a batch of ice cubes is placed in the conveying conduit while the air is cut off from the conduit. The ice cubes or pieces are then, as in the earlier systems, directly engaged by the conveying medium, that is the air, and literally blown to the remote location. However, it was found that this prior art system suffers the same drawbacks of allowing unacceptable levels of breakage, especially as the ice is blown at high velocity into the bin, and inducing high levels of melting of the ice cubes. Also, as soon as the initial blast of conveying medium hits the batch, the cubes are separated, and then string out, as the high velocity air forces its way through the interstices between the cubes. This high velocity air, and its exposure to the full surface area of substantially every cube, is what causes the excessive melting. Also, as the cubes break away from each other, the tumbling action not only contributes to breakage, but also generates excessive noise as the ice travels along the delivery tubes. This system is illustrated in U.S. Pat. No. 5,354,152, issued on Aug. 11, 1994 and 5,549,421, issued on Aug. 27, 1996.

In addition, the system of the '152 and '421 patents is inefficient in that the satellite bins are preferably connected in parallel thereby further increasing the cost of the system. This prior art system is slow in that a new batch of ice cannot be formed while the previous batch is being delivered, and there is a requirement that there can be no air assist to introduce the ice into the transport tube. In addition, this arrangement makes it very difficult to provide cleaning of the system, as is required on a regular basis.

Accordingly, a need exists for a distribution or transportation system for ice cubes or pieces, and/or a similar beverage dispenser, that is more efficient, operates more rapidly and reliably and substantially eliminates the problems of breakage, noise and melting of the ice during the delivery to the satellite ice/beverage dispensing machines. Furthermore, another significant objective and advance in the art is simplifying the system to lower the initial cost and to keep the reliability up and the cost of maintenance down. Still another key aspect is to provide an efficient and rapid system for cleaning for this and similar distribution systems.

BRIEF DESCRIPTION OF THE INVENTION

In accordance with these objectives and others, the present invention contemplates centralizing the supply of ice cubes or pieces in a primary bin of an ice dispensing machine, and through a single delivery tube communicating between the primary bin and a satellite bin, delivering controlled batches or charges of ice pieces to the satellite bin. A driver member gently engages the charge, and then rapidly drives it along the tube toward the satellite bin, while maintaining the pieces in a substantially close contact or formation. The driver member releases the charge at the proper point upstream of the satellite bin to efficiently and rapidly transfer the charge into the satellite bin from the tube. Because only the driver member, and not the propelling medium actually engages the charge of ice pieces at its trailing end or face as it is delivered to the satellite bin, the deleterious breakage and melting of the pieces is minimized.

In the operation of the present invention, there is no high pressure/high velocity air flow extending into the charge causing a turbulence, tumbling of the pieces, and slamming of the pieces at high velocity into the bin. As a result, excessive breaking and melting, as well as annoying noise, is eliminated. Instead, the driver member gently engages the trailing end of the charge and compresses the pieces together, and then accelerates to rapidly move the charge to the designated satellite bin. Once the pieces are delivered, the driver member then quickly returns to the home position to repeat the cycle, as required.

Preferably, the driver member is a piston, which can be in the form of a spool, cylinder, sphere or other suitable form.

It should be sized for tightly or closely fitting inside the tube, and is preferably flexible, molded plastic. In some instances, urethane foam may be used to advantage. The piston is propelled by providing a differential pressure inside the tube acting across the piston. During delivery of the charge of ice, the high pressure is confined to the upstream face, leaving only low pressure on the downstream face and in contact with the ice pieces. By maintaining the charge in generally tight formation over most of the path of travel, and free of any turbulence caused by high pressure air blowing across and through the charge, not only is the process carried out in a rapid fashion, but tests have proven the efficiency in terms of minimizing breakage, melting and noise level of the pieces in transit.

As another advantage, provision is made in accordance with the preferred embodiment of the invention to simply reverse the differential pressure and air flow in the system to quickly shuttle the piston back to the home position to repeat the cycle. In effect, the piston in the system of the present invention simply moves back-and-forth between the primary and the satellite bins along a single delivery and return path. Where more than one satellite bin is used, the bins are connected in series, rather than in parallel to thus greatly simplify the cost and maintenance of the delivery tube, which forms a major part of the entire system.

In a system with an intermediate satellite bin, that is where there is more than one satellite bin in the system, the single delivery and return tube passes in a serpentine fashion adjacent to or through each of the intermediate satellite bins; it being understood that the tube terminates or ends adjacent the final satellite bin in the series. In order to deliver the charge of ice from the tube in one of the intermediate bins, a movable or flexible section and its end is deflected away from alignment with the tube as it continues past the bin toward the ultimate end. In the deflected position, the charge of ice pieces can be directly discharged into the intermediate bin.

In the event that additional ice is called for by the intermediate bin, on the next cycle the movable section is again shifted to the deflected position. On the other hand, if that intermediate bin is detected on the next cycle as being full, the movable tube is then shifted back into alignment. Then the continuous delivery tube from one end to the other, wherever it happens to be, is again formed and ice may be once again delivered to the end satellite bin at that time.

Preferably, the primary bin and the dispensing machine for delivering the charge of ice pieces to the delivery tube takes the form of the standard ice and/or beverage dispenser machine, such as in accordance with the features of the '685 patent, and this patent is incorporated by reference in this application. As illustrated, and as described in detail in the patent, the ice is delivered in relatively small clumps of pieces to a transfer chute that communicates with the delivery tube through a slide or rotary valve.

If desired, multiple primary bins/dispensing machines can be used; the delivery tubes being merged into one tube before delivery to the satellite bins. Also, the primary bin can be modified from that shown in the '685 patent by adding a precharge chamber with an air assist to provide an air stream to quickly move each charge into the transport tube. In this instance, the very short duration exposure of the ice pieces to the air stream, and the movement of the stream into the tube with the ice pieces, is desirable to assure against possible freeze-up and resultant ice blockage. Also, an additional upper platform within the bin, having a delivery slot formed in the center and a separate agitator can be provided for the same overall purpose of assuring freedom of movement of the ice pieces and each charge. The platform supports the additional weight of an extra supply of ice pieces to increase the bin's capacity. Furthermore, a high capacity ice maker can be positioned on top of the dispenser machine in order to drop the ice directly into the bin. A door may be provided to manually add ice to the primary bin, if desired.

In addition, it will be realized that the basic ice dispenser concept of the '685 patent is ideally suited for use in dispensing the ice from each of the satellite bins. In both the primary bin and the satellite bins, the flow of ice from the rotating wheel is advantageously agitated and regulated to provide the desired controlled input of ice to form the charge to be delivered through the distribution system, or as a serving of ice pieces/beverage to the customer. Of course, it will be realized that with the present invention, the satellite bins, and thus the entire ice dispenser machines, can be made much smaller since the bins can be drastically reduced in size. Indeed, not only is the footprint of a counter top machine reduced, but in many instances the dispenser machine can be wall mounted, or even mounted back-to-back for even higher volume areas. It is contemplated that such back-to-back units occupy essentially the same footprint as a single dispenser unit before.

From the above description of the basic invention, it will now be realized that by separating, and thus, isolating the ice pieces from the propelling medium by interposing the piston in the delivery tube, substantial improved results and advantages are attained. There is no high velocity air to engage the ice pieces causing separation and string out of the pieces during transit. There are no forces to induce tumbling action that greatly increases breakage, as well as melting. Also, since the propelling medium does not directly engage the ice pieces and cause separation during transportation to the satellite bins, substantially less power is required to generate the driving force to transfer each ice piece charge. In particular, in the prior art arrangements, at least a 1½ hp motor is required to generate the air flow; whereas, in the present invention only ⅛th hp is required to convey the charge of ice pieces of approximately 1½–2½ lbs. each or more. Since in the present invention, the charge of ice pieces is transferred while remaining in substantially close or tight formation, there is minimum breakaway of the ice pieces; that is, except for some limited free-fall of the leading pieces along downwardly directed, vertical sections. This greatly reduces the noise as the ice is being transported. In effect, the charge travels at an average lower velocity, but reaches the satellite bin in a more efficient and faster average time.

According to another important feature of the present invention, the delivery tube is lubricated as the driver member picks up and sweeps the minimal residual water from the melting of the ice pieces along the tube. Also, this sweeping action provides continuously cleaning of the tube. It can also be periodically fully cleaned, in an efficient and quick manner, by the action of the driver member. For full cleaning, injectors adjacent the first end of the tube provide in sequence the cleaning or sanitizing fluid and the rinse water, the driver member or piston being operated in a back-and-forth cycle moving along the length of the delivery tube after each injection.

The continuous cleaning occurs during every delivery cycle of ice pieces. During full cleaning, the cleaning fluid, and then the rinse water, is pushed or swept along the tube in front and back of the piston causing a very efficient scrubbing and sweeping action. This full or two-phase cleaning may of course be provided at any interval, usually at the beginning and/or completion of a work shift.

One of the most significant features of the cleaning cycle, as described with regard to the ice transport cycle above, regardless of the type of ice piece transport system that is used, is that the piston travels all the way to the end of the delivery tube and then is automatically reversed to shuttle back to the home position. There is no need for manual handling of the piston at any time. At the end of the delivery tube, that is at the end satellite bin, or at the final ice dispensing machine in series, a catch basin is provided for dumping the residual water/cleaning fluid/rinse water. An angled screen is provided below the exit orifice of the tube section to allow the fluid/water to pass through to a drain, while allowing the ice pieces being delivered into the satellite bin during an ice piece delivery cycle, to be deflected to the side and into the bin for use. Alternatively, the end section of the delivery tube can be made movable or flexible, as described in conjunction with the intermediate satellite bin, and by an actuator the tube section is simply deflected away from the bin and into an open catch basin.

Each of the satellite bins includes a level sensor to interrupt, and place on standby, the operation of the ice dispenser at the central supply location, and at the same time interrupt the operation of the fan that generates the differential pressure. This action occurs once the piston has returned to its home position.

Preferably, a controller is provided in an electronic circuit for operating and coordinating the dispenser, the fan or fans and all other components/parameters of the system. A computer (CPU) is provided as a part of the controller, along with an operator/machine interface, such as a keyboard, in order to change the operation parameters of the controller, as desired. In the preferred embodiment with at least one intermediate satellite bin, and with both bins having their own level sensor, the controller is made operative to switch the delivery of each charge of pieces in accordance with the need.

As an additional feature, the speed of the fan, and/or flow valves can be adjusted or operated for varying the differential pressure and volume of air flow to closely control the movement of the piston. With this arrangement, the velocity of the piston may be reduced at the point of initial engagement of its downstream face with the trailing end of a charge of ice pieces so as to soften the impact, and thus further minimize breakage. Thereafter, the differential pressure and air flow volume can be increased to provide for gentle, but firm compression of the pieces in the charge, and then rapid transfer to the selected satellite bin.

Each of the valves and other actuator mechanisms of the system are ideally actuated and controlled by the controller, in response to conditions within the system, as well as interpretive adjustment made by the operator. As presently contemplated, and within the broadest aspects of the present invention, the valves/actuators can be in each instance either a solenoid, stepper motor or servo motor, or similar equivalent device.

In addition to careful control of the piston in order to minimize breakage of the ice pieces, the level sensor associated with the satellite bin provides further protection. The sensor takes the form of a pivotal flapper member that extends into the path of flow of the ice from the delivery tube. As each charge is delivered, the impact of the ice piece flow, as it drops by gravity into the bin, is partially broken by engagement in flight with the flapper member. The force of the impact, or a rotary solenoid, in turn moves the flapper member out over the mound of ice to read the current level. When the charge of ice pieces being delivered then clears the flapper member, it pivots back to its position to intercept the next charge. In the instance where the bin is full, the top of the pile holds the flapper member away from the tube, thus activating an associated microswitch of the control circuit. The actuation of this switch provides confirmation through the computer that the particular ice dispenser bin is full, and that the distribution system of the present invention can then deliver the next charge of ice pieces to a bin calling for more ice.

The sensor for signaling reversal of the differential pressure is positioned on or adjacent the delivery tube as it is directed around the curve heading for the dispenser bin being filled. Just as the piston enters the curve, the sensor signals the controller to switch the differential pressure, and the piston immediately starts back. The momentum of the ice and gravity delivers the charge along this final downward leg.

This piston reversing signal from the satellite bin also confirms arrival of the ice pieces charge in each instance. In this manner, a more predictable and reliable delivery cycle is obtained. In other words, the computer of the control circuit is aware that the tube is cleared, as soon as the piston activates the position sensor positioned above each satellite bin. For this reason, with the distribution/transportation system of the present invention, the operator does not have to build in a buffer time before the next charge of ice pieces is delivered. The ice pieces can be delivered to the precharge chamber to form the next batch as the previous batch is being delivered, and during the time the piston is being returned to the home position. In addition, the transportation system concept of the present invention lends itself equally well to large or small charges of ice pieces, or the like. Theoretically, the size of the charge is limited only by the power used in the system for generating the differential pressure across the piston. However, in any case, the power required is much less than required for prior ice piece transport systems.

As mentioned above, the advantage of using a piston to drive the charge along the delivery tube with each cycle allows any residual water along the tube to provide lubrication. This speeds up the operation and prevents any tendency for a jam to occur. Of course, at the same time, the piston, or other driver member used, sweeps the tube clean. The water is swept along the downstream side of the piston along with the ice pieces. Any water from melted ice deposited within the bin is to be drained through the bottom drain, in the usual fashion. This continuous cleaning feature minimizes the need for full cleaning of the system with sanitizing or cleaning fluid and rinse water. Also, the adaptability of the system provides the designer greater flexibility in that the delivery tube does not have to be free of low spots. In fact, the option is now available to even run the delivery tube through the floor service trough of the restaurant, if desired.

In accordance with the method of the present invention, the first step is to supply a charge of ice pieces to the precharge chamber, and thence to the delivery or transport tube; secondly, engage the trailing end of the batch or charge by the downstream face of a driver member, such as a piston, propel the driver member along the tube for delivery of the ice pieces to the satellite bin of the system; and finally maintain the pieces in substantially close formation and on the low pressure side, so as to be insulated from the deleterious air flow on the upstream high pressure side during the delivery. As described with respect to the apparatus features, the method provides for efficiently and rapidly transferring the defined charge to the satellite bin in a manner to minimize breakage, melting and noise. At the satellite bin, ice is dispensed on a first in/first out basis by the rotary paddle wheel dispenser and delivered into the cup of a user, with or without water, a soft drink beverage solution or the like.

To perform the method in the most efficient manner, the driver member is propelled by simply establishing a differential air pressure across it and maintaining the high pressure propelling medium on the upstream face. Advantageously, since the ice piece charge encounters only low pressure on the downstream face of the driver member, and not the propelling medium, the pieces are thus isolated and not subject to being separated and tumbled by the air. This is the main factor in minimizing breakage and melting. At the same time, the use of the driver member is a significant contributing factor in cutting the average cycle time of each charge to a minimum. Further, the double shift charging of the next batch, that is filling the precharge chamber while the previous charge is being transported, and the pneumatic assist in feeding each charge into the transport tube, saves additional time and further shortens the cycle time in the method.

The concept in the method of simply reversing the differential pressure before reaching the end of the delivery tube to automatically shuttle the driver member back to the home position during the ice piece delivery also greatly reduces the time involved in each cycle. This is so since a full loop along a separate return run tube, as required in some prior art systems, is eliminated. This feature is also important during the cleaning step of the method, since the sweeping action is present in both directions of movement, as will be discussed more in detail below.

Thus, the transportation system/method of the present invention lends itself to a much more efficient cleaning cycle than heretofore possible. There is continuous, short term cleaning by the sweeping action of the water from the minimum melted ice along the tube. Furthermore, for the major cleaning, the driver member or piston fully scrubs the tube interior using sanitizing/cleaning fluid or solution/rinse water, while the path of travel is kept to a minimum. During a cleaning operation, the fluid/water is injected in front of the downstream face of the driver member adjacent the first end of the tube in the home position, and thereafter the driver member is operated through a full cycle by movement along the tube, and automatically reversed to return. In this manner, scrubbing/sweeping action and cleaning is realized along substantially the full length of the tube, and in both directions.

Not only is the ice delivery method enhanced by arranging the satellite bins in series, rather than in parallel as in the prior art, but the cleaning cycle is also substantially enhanced since passage is required only along a common or single serpentine delivery and return path.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

DESCRIPTION OF THE DRAWINGS

The accompanying drawings incorporated in and forming a part of the specification, illustrates several aspects of the present invention and together with the description serves to explain the principles of the invention. In the drawing:

FIG. 2 is an enlarged schematic view, partially in cross section illustrating a simplified arrangement for generating the differential pressure for operating the distribution system and also illustrating the valves for switching the air and for dispensing the ice pieces to form a charge;

FIG. 2a is a cross sectional view along the line 2a–2a of one valve suitable for applying and switching the differential pressure of the delivery tube;

FIG. 2b is a schematic view of the differential pressure/valve arrangement of FIG. 2a, but illustrating the piston being delivered by pressurized air through the ice delivery valve and engaging the trailing end of the charge of ice ready for delivery, with the first ice pieces of the next charge being fed into the precharge chamber;

FIG. 2c is an alterative embodiment of a similar system for generating the differential pressure by dual fans for operation of the distribution system;

FIGS. 2d and 2e are schematic illustrations of a differential pressure/valve arrangement in the two modes of operation, and includes a two-way control valve, a vacuum generator based on the Venturi principle for returning the piston, and a cooperating shuttle control gate for the ice delivery port;

FIGS. 2f/2f' and 2g/2g' show a preferred embodiment, which is basically a hybrid differential pressure/valve arrangement between the arrangements of FIGS. 2–2c and 2d, 2e;

Reference will now be made in detail to the present preferred embodiment of the invention, an example of which is illustrated in the accompanying drawings.

DETAILED DESCRIPTION OF THE PREFERRED EMBODIMENT

Figure 1:
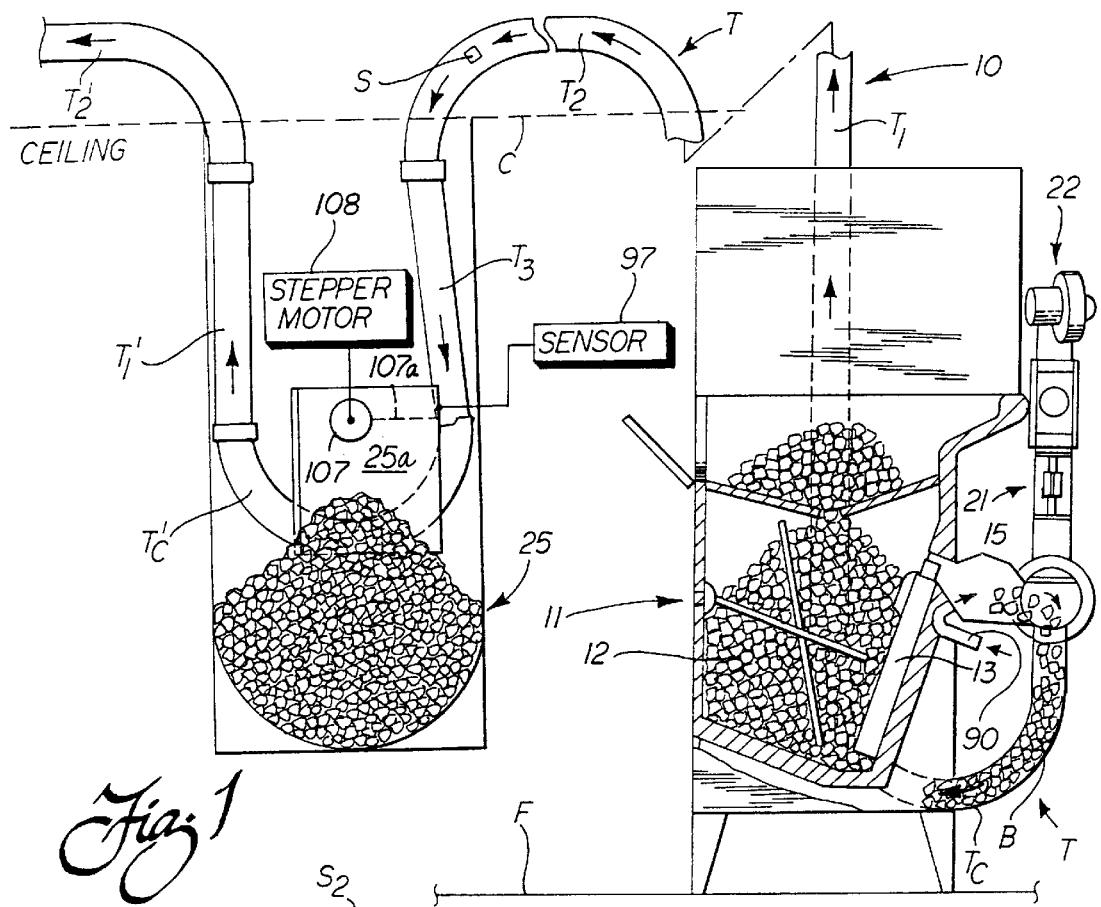
FIGS. 1 and 1a comprise a composite overall schematic view of the ice piece distribution system of the present invention.
Figure 1A:
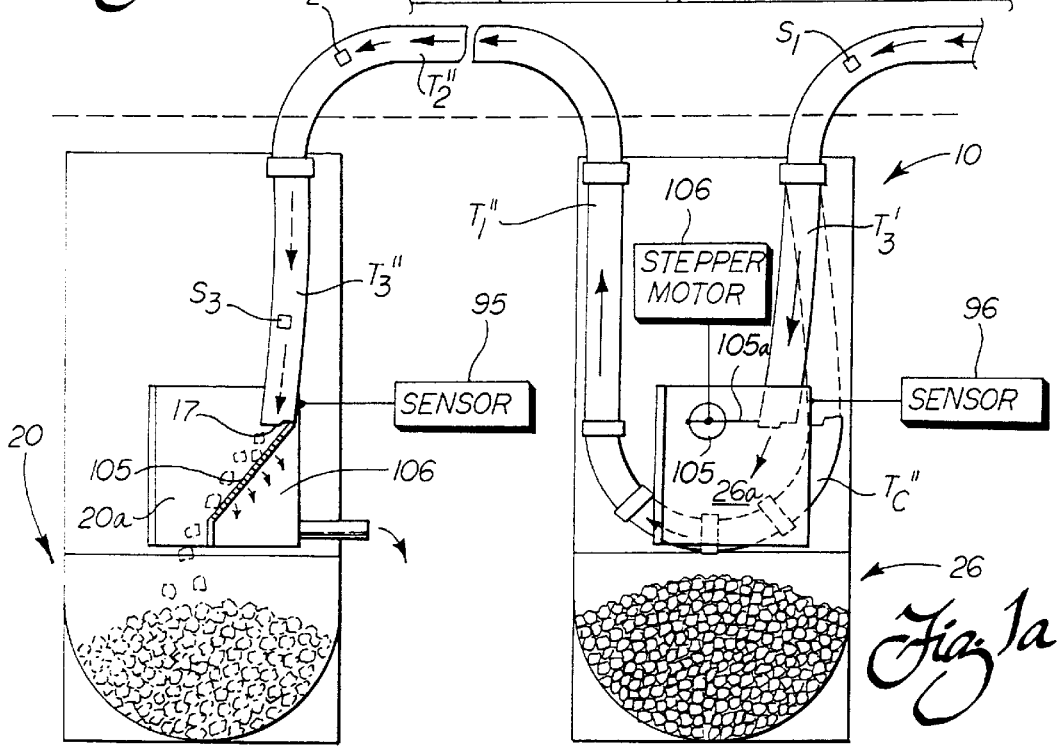

With reference now to composite FIG. 1, 1a of the drawings, a more detailed explanation of the preferred embodiment of the invention can be given. A transportation or distribution system, generally designated by the reference numeral 10, includes an ice dispensing machine 11 that includes a primary ice bin 12 for holding a supply of ice pieces. It will be understood within the broadest aspects of the present invention, that the term "piece" refers to any form or shape of ice pieces, such as pillow shaped, cylindrical, with or without a hole through the center, or for that manner any other convenient shape.

The dispensing machine 11, as pointed out above, can be based on any prior art machine, but as a preferred embodiment the machine is as shown in the prior '685 patent. In this regard, it is important that the ice pieces be distributed from the bin 12 in a regulated and controlled fashion. A rotating wheel 13 with a peripheral array of paddles within the bin 12 is considered at the present time to be the optimum way to do this. This ice machine 11 is placed in a central location, such as in the kitchen or the food preparation area of the restaurant.

While it is clear in the preferred embodiment form of the invention shown, that ice pieces are particularly adapted to being distributed, use with other loose, meltable solids or lump material with similar characteristics, or otherwise subject to deterioration when exposed to high energy air and in other environments, is envisioned within its broadest aspects. Generally, in any environment, but particularly in the food industry, all that is necessary to make use of this invention is a need for delivering the loose solid material that requires insulation to a remote location in an efficient and rapid manner.

Extending from the side of the ice dispenser 11 is a precharge chamber 15 for holding a charge and then delivering the ice pieces in a regulated/controlled fashion to a serpentine transport or delivery tube T, with its first end adjacent to the chamber 15. The tube T first extends downwardly toward floor F, around an approximately 180° U-shaped curve $T_c$ and then directly up toward ceiling C. As illustrated, this vertical, upwardly directed transport section $T_1$ then turns through a 90° curve to a horizontal transport section $T_2$, whereupon it curves downwardly through 90° to a generally vertical, depending transport/feed section $T_3$.

The delivery tube T then continues from the depending transport/feed section $T_3$ and through a second generally U-shaped section $T_c'$, which preferably makes a turn of more than 180°, that is approximately 190°, for a purpose that will be explained in detail later. From the section $T_c'$, the serpentine path continues to a second upwardly directed transport section $T_1'$, through a second horizontal transport section $T_2'$ bounded by two substantially 90' turns. Then the delivery tube T enters a second transport/feed section $T_3'$ (see FIG. 1a). As illustrated, the section $T_3'$ is illustrated in full line as being deflected or moved from the serpentine path, which is thus the feed position for the charge of ice pieces, as will be defined more in detail later.

The U-shaped section $T_c''$ continues the path to connect to the next upward transport section $T_1''$, and thence the flow continues through the horizontal transport section $T_2''$. In the particular distribution system that is illustrated in FIGS. 1, 1a, specifically for the purpose of showing one embodiment of how the principles of the invention can be carried out, the serpentine delivery tube T then terminates in a final depending transport/feed section $T_3''$. As clearly shown in FIG. 1a, the section $T_3''$ simply terminates in an exit orifice 17, thus forming the second end in this configuration of the delivery tube T.

Positioned to receive a charge of ice pieces being transported through the tube T is a satellite bin, generally designated by the reference numeral 20. It will be understood that this satellite bin 20 is a part of an ice and/or beverage dispensing machine that operates on the same principles as the dispensing machine 11, described above. The delivery wheel 13 and other representative parts of the machine are omitted for clarity. Suffice it to say that the bin 20 is communicating with the delivery tube T by virtue of the exit orifice 17 being positioned to deposit a charge B of ice pieces from operation of the system.

With reference now back to FIG. 1, a driver member 21, which may take the form of a piston, is illustrated positioned inside the tube T adjacent the first end. Above this, is illustrated a propelling means 22, which will be described in a preferred embodiment and a couple of alternative embodiments below.

The propelling means 22 is operative to cause the driver member 21, which fits closely inside said tube T, to first move downwardly along the tube T by differential air pressure, gently engage the charge of ice pieces B that has been fed into position by the precharge chamber 15 filled by the dispensing machine 11, and then move the charge along the tube T toward the satellite bin 20. As will be clearer as the detailed description unfolds, the driver member 20 is able to rapidly negotiate the full extent of the serpentine path of the delivery tube T and in an efficient and rapid manner transfer the ice pieces in a substantially defined charge, while minimizing breaking and melting of the ice pieces along the way.

One important advantage of the distribution system 10 of the present invention is that the transfer of the charge B of ice pieces over the entire length of the transport tube T is accomplished along a single transport path, as defined above. Along the path, any number of additional satellite bins can be incorporated into the system 10. For example, a second satellite bin, generally designated by the reference numeral 25, is shown in FIG. 1, just downstream of the depending transport/feed section $T_3$, and a third satellite bin 26 is illustrated in FIG. 1a just downstream of the transport/feed section $T_3'$. Between the primary ice bin 12 of the dispensing machine 11 and the second satellite bin 25, a break is illustrated in the delivery tube T to represent the concept that any suitable distance can be provided between these two bins. Similarly, there is a break from FIG. 1 to FIG. 1a to represent the fact that in accordance with the present invention the third satellite bin 26 can be located any suitable spaced distance from the second bin 25; it being understood that likewise the end satellite bin 20 can be spaced as close or spaced as far apart as the demands of the distribution system 10 requires. The satellite bins 25, 26 are a part of an ice/beverage dispensing machine, such as preferably the '685 dispensing machine, but possibly on a reduced scale, if desired. Those machines that include beverage or drink dispensing capability may also include a cold plate, as is known in the industry.

With specific reference now to FIG. 2, more detail of a suitable propelling means 22 that can be advantageously used to move the driving member or piston 21 along the serpentine path of the delivery tube T can now be explained. First, the member 21 can be of any suitable configuration, and at the present time, the preferred embodiment is generally in the form of a spool; that is, having two circular plates 30, 31 to form the upstream and downstream faces of the piston, respectfully. Of course, the plates 30, 31 are connected by a body 32 of a relatively small diameter. Positioned in the center of the body 32 can be a fin 33 of magnetic material, the purpose of which is to serve as a part of the position sensing means, as will be explained later. The plates 30, 31 have a relatively deformable plastic sealing ring that is in sufficiently close fitting contact in the tube T to provide both lubrication and continuous cleaning by sweeping the minimal, residual water present along said tube from ice meltage, as will be explained further below. Generally, a ¹⁄₆₄–¹⁄₃₂ inch total clearance works well in this regard. The narrow dimension of the plates/sealing ring allows the member 21 to more easily negotiate the curves/turns in the tube T (see FIG. 2e, for example).

Making the driving member 21 in the form of a spool, as illustrated to be the preferred embodiment, has several other advantages. First of all, it is lightweight so as to contribute to the low power requirements of the distribution system 10. Especially in the return or shuttle mode of operation of the spool 30–33, the movement can be made very rapid so that precious seconds are saved that can be used to repeat the cycle and deliver the next charge B of ice pieces. Secondly, it lends itself well to attaching the magnetic fin 33 that is used for position sensing along the travel path.

Another advantage of the spool form of driving member 21 is that the structural elements of the spool can be made inexpensively of movable plastic. This construction further contributes to the driving member 21 being able to easily negotiate the curves and turns along the delivery tube T, as explained above. That is, as the spool 30–33 negotiates the curves/turns, the plate 31 that forms the leading face can, if necessary, flex along with accommodating flexure of the body 32 (see FIG. 2e). If desired, radial slits (not shown), or other mechanical changes, can be made on the plates 30, 31 in order to provide just the right balance between the propelling force for the charge B of ice pieces, and the scrubbing and sweeping action. Of course, the latter function is important to push residual water along to the bins 20, 25 or 26, for continuous cleaning, as well as for full, two phase cleaning action during the cleaning cycle.

Since the thickness of the plates 30, 31 is relatively thin, the useful force per unit area acting radially outward from the plates 30, 31 against the inside of the delivery tube T provides extra sealing efficiency, as well as increased sweeping and scrubbing action. Of course, within the broader aspects of the present invention, other forms of the driver member 21 are contemplated, such as full cylindrical, spherical or any other suitable shape. While the structural parts of the spool 30–32 are preferably molded plastic, other types of material can of course be used. Furthermore, the driver member 21 can take the form of solid foam, such as fabricated from a urethane block of material. In any case, the desired prerequisite is to provide a lightweight, but sufficiently strong, driver member 21 that can rapidly push the charge B of ice around the serpentine delivery path, negotiate the curves and turns, perform the cleaning function and in each case rapidly return to the home position.

One form of the propelling means that can be successfully utilized in accordance with the broad aspects of the present invention, is illustrated schematically in FIG. 2. Just above the home position for the driver member 21, a stationary sleeve 35 is positioned inside the tube T. As illustrated, in FIG. 2a, the sleeve 35 includes two opposed flow orifices 36, 37. An inner rotary valve member 38 has two transfer orifices 39, 40, angularly spaced by 90°. A lever 41 is connected to the valve member 38 and through a stepper or servo motor 42 is operative to switch the propelling means between the driving mode for the driver member 21 and the return shuttle mode.

An air flow conduit extends between flow orifices 36, 37 with a fan 46 being positioned at a mid point and driven by motor 47. Gate valves 48, 49 on opposite sides of the air flow conduit 45 are opened and closed by corresponding servo motors 50, 51. Thus, a differential pressure system may be provided by appropriate operation of the motor 47 and the rotary valve member 38 and gate valves 48, 49. For example, as illustrated in FIG. 2 for the return/shuttle mode of operation to return the driver member 21 to the home position and to retain it there, the stepper motor 42 positions the valve member 38 in the position shown (see also FIG. 2a). The air above the driver member is evacuated in response to the fan 46 through the air flow conduit 45 in the direction shown. The gate valve 48 is closed in this mode of operation allowing the only air to enter to be above the driver member 21 and to be exhausted through the open gate valve 49. Also, in this mode of operation, rotary capture valve 55 rotates to the position shown by operation of stepper motor 56. In this position, the tube above the valve 55 is closed, but the precharge chamber 15 is open to allow passage of the ice pieces, as illustrated.

Just above the rotary capture valve 55 and downstream from the home position of the driver member 21 is a first injector pipe 58 connected to a source of cleaning liquid or solution 59. At the appropriate time during a cleaning cycle, a solenoid valve 60 is opened to spray cleaning solution into the tube T. Similarly, a second injector pipe 61 is connected to a rinse water source 62 through a solenoid valve 63. As will be seen more in detail below, during the sanitizing or cleaning cycle after the injection of the sanitizing/cleaning liquid through pipe 58, the driver member 21 moves back-and-forth along the length of the delivery tube T to spread the liquid and to scrub and sweep the entire inside of the tube T. The same procedure is followed with the rinse water injected through the injector pipe 61. The entire full, two phase cleaning cycle comprises several passes by the driver member 21 with cleaning solution, followed by several passes with the rinse water 62. Of course, during the movement of the driver 21 for delivering the charge B of ice pieces to the satellite bins 20, 25 or 26, there is continuous sweeping and cleaning action to a degree where it has been found in same instances little or no full cleaning operations are required. During the continuous or two-phase cleaning cycle, the rotary valve 55 is opened by the stepper motor 56, as illustrated in FIG. 2b, and as will now be described.

Thus, during the delivery mode or cleaning cycle of the operation of the distribution system 10 of the present invention, the propelling means or propeller 22 is operating, as illustrated in FIG. 2b. To provide the differential air pressure causing the driver member 21 to move away from its upper home position of FIG. 2 (see dotted line position), the rotary valve member 38 is rotated through 90° by the stepper motor 42, and simultaneously the rotary valve 55 is likewise rotated through 90° by the stepper motor 56. in this position of the propelling means to provide the differential pressure, the charge B of ice pieces has been completely made, and as pointed above transferred from the precharge chamber 15. The gate valve 48 is open to form an intake so that the fan 46 driven by the fan motor 47 can move ambient air in the direction of the arrows, as shown in this figure. Gate valve 49 is closed so that then positive, relatively high dynamic pressure air is introduced to the tube T through the aligned orifices 37, 40. The movement of the driver member 21, as illustrated to the dashed line position, can be proportionally illustrated by the dashed line action arrow $A_1$. As the driver member 21 passes through the rotary valve 55 and approaches the charge B of ice pieces previously formed and delivered as a complete charge from the chamber 15, due to the air resistance from the tube T being blocked by the charge B, and due to appropriate manipulation of the intake gate valve 48 and/or the fan motor 47, the velocity is decreased, as shown by the full line action arrow $A_2$ just above the full line illustration of the driver member 21. Then, once the charge is thus gently engaged, the gate valve 48 can be opened fully and/or the motor 47 can increase its speed, so that the charge B is driven at the maximum desired speed, as represented by the action arrow $A_3$. This sequence minimizes breakage by reducing the impact against the ice pieces, but at the same time maximizes the speed of movement of the charge B through the delivery tube T. At this point, the dispenser wheel 13 can already begin filling the precharge chamber 15 with the next ice charge for the next transport/delivery cycle, as illustrated in FIG. 2b.

A second alternative of a suitable differential pressure generator and valve arrangement to provide the propelling means or propeller for the driver member 21 is shown is FIG. 2c. In this arrangement, the rotary valve member 38 operates in the same manner in response to the stepper motor 42. Gate valves 48a, 49a driven by servo motors 50a, 51a operate essentially in the same manner as before but a separate intake and exhaust port is not formed along the air flow conduit 45a, 45b. Thus, in the reverse/shuttle mode of operation to bring the driver member 21 back to the home position, once the orifices 36, 39 are aligned (see FIG. 2a) the vacuum within the tube T is established. The ambient pressure in the tube T lifts the driver member 21, 30–33 from below and holds it in its home position, as shown.

The benefit of this second alternative, is that a fan 70 and fan motor 71 is utilized to generate the vacuum or negative pressure, and a separate fan 72 and motor 73 is used for the positive pressure. As will be apparent, this push-pull arrangement is desirable to allow continuous operation of the low power fans 70, 72 (⅕ HP) providing immediate response when a reversal of the driver member 21 is required. By switching the gate valve 48a to the closed (dashed line position) and opening the gate valve 49a (dashed line position), and switching the valve member 38 through 90° to the same relative position as shown FIG. 2b, the high pressure air is immediately inputted to the tube T to drive the driver member 21 downwardly and into gentle engagement with the charge B. The same sequence of action arrows $A_1$, $A_2$, $A_3$, as previously described, applies in this case. By using separate fans 70, 72, there is no likelihood of contamination of the interior of the delivery tube T since they are always driving in the same direction. Any debris that might inadvertently deposited in the tube T on one cycle cannot be caught by the fan blades, and then reintroduced into the tube T.

A third alternative embodiment of the propelling means of the present invention is illustrated in FIGS. 2d and 2e. In this instance, the same functions apply, as described with respect to the arrangement in FIG. 2c. However, the pressure generating system is different, and the rotary valve 55 is replaced by a slide, shuttle type valve. More particularly, as the driver member 21 moves toward its home position of FIG. 2d, it lifts a slide, shuttle type sleeve valve 75 until it abuts against spaced projections 76. This establishes a flow path through passageway 77 for the flow of air, as denoted by the flow arrows in FIG. 2d.

Downstream of the passageway 77 is a two way rotary valve 78 that allows passage of this air through an exhaust tube 79. With the sleeve valve 75 in its home position, ice delivery port 80, that aligns with the precharge chamber 15 of the ice dispensing machine 11, is thus uncovered allowing entry of the regulated/controlled charge of ice pieces to form the charge B; the charge in the preferred method being approximately 1½–2½ lbs. of ice pieces.

The vacuum or negative pressure established through the passageway 77 is formed in a unique way in this particular environment by utilizing a nozzle 85 extending into the exhaust tube 79. The nozzle is fed with high pressure air from a fan driven by a fan motor 47a, similar to that shown in the alternate embodiment of FIG. 2b. As illustrated in FIG. 2d, adjacent the exit port of the nozzle 85, the air in the exhaust tube 79, the passageway 77 and the tube T is evacuated by generation of suction, due to the Venturi effect or principle. In this manner, a single fan motor 47a can be utilized. At the same time, the flow of air from the tube T is never exposed to fan blades or the interior of a fan, as is the case also with respect to the alternative embodiment of FIG. 2c. The two-way valve 78 is operated by a stepper motor 87.

A simple movement of the valve 78 switches to the driving or propelling mode of the driver member 21. The fan 86, through the passageway 77, serves to pressurize the chamber in the top of the tube T, and moves the driver member 21 down into engagement with the charge B of ice pieces. From here, the movement of the driver member propels the charge B through the delivery tube T to the satellite bins 20, 25, 26, as described. For simplicity, the sanitizing fluid/rinse water injector pipes 58, 61 have been omitted from this illustration, although it is to be understood that these are included in this embodiment in the same relative position as shown with respect to FIGS. 2 and 2b. The ice delivery port 80 is blocked once the driver member 21 passes the passageway 77, since the shuttle valve 75 follows the driver member 21 into the position shown in FIG. 2e. The simplicity of this arrangement makes it an excellent embodiment for providing the differential pressure and the switching action from one mode to the other.

A final embodiment, and preferred at the present time, is illustrated in FIGS. 2f, 2f' and 2g, 2g' and is a hybrid of the above 2c–e embodiments. The dual fans 70, 71 operate through a rotary valve member 38 actuated by the stepper motor 42. In FIG. 2f, the driver member 21 and the slide valve member 75 are lifted to their home position by the vacuum pull of the first fan 70. The charge B is being rapidly delivered as a relatively composite or closely coupled charge B, or at least a portion of a full charge B, into the tube T.

A nozzle 90 (see also FIGS. 1 and 2b) having an orifice 91 forms an air assist stream (see top view of the precharge chamber 15 in FIG. 2f') to quickly transfer the preformed portion/full charge B into the tube T. As will be realized, the charge B can begin forming as soon as the driver member 21 leaves its home position and the slide valve member 75 closes the delivery port 80 (see FIGS. 2g, 2g'). Thus, the system of the present invention operates on a double shift with time being saved by the filling of the precharge chamber 15 occurring at the same time as the driver member 21 is shuttling through a full cycle in the tube T.

Advantageously, as the stream from the nozzle/orifice 90, 91 acts on the preformed charge, the ice pieces are prevented from freezing together and forming an ice blockage, as has been experienced as a problem in the past. Most importantly, the air stream from the orifice 91 provides the desired air assist to transfer the composite ice pieces into the tube T as quickly as possible saving more valuable cycle time. In doing so, the air is in contact, and not isolated from the charge B of ice pieces, as it enters the transport tube T. The differential air pressure to form the stream is provided from the positive pressure plenum of either the fan 46, as in FIGS. 2 and 6, or the fan 72 of FIG. 2c, and controlled by a suitable solenoid valve 92 connected to the controller 110 (see FIG. 6).

Regardless of the system providing the propelling means to establish the differential pressure air across the driver member 21, it will be realized that a highly efficient operation is achieved. An important feature is that the high pressure propelling medium on the upstream side of the driver member 21 does not come into contact with, and is thus isolated from, the charge B of the ice pieces. To put it another way, the charge B is maintained in contact only with the low pressure or ambient pressure side of the system, and insulated from the high pressure side and harmful upstream air flow, during propelling of the charge B to one of the satellite bins 20, 25, 26. This advantageously allows the relatively high pressure air flow behind the driver member 21 to deliver the ice pieces in a substantially defined charge. As indicated above, this means that tumbling, due to the contact of the high velocity air with the ice pieces that cause breakage, melting and excessive noise is eliminated.

From the position of gentle, but firm engagement of the charge B shown in either FIGS. 2b, 2e or 2g, it will be realized that the ice pieces can be efficiently and rapidly transferred to any one of the selected satellite bins in a manner not heretofore possible. There is no slippage of the propelling medium or force, since the end plates 30, 31 of the driver member 21 effectively seal the tube T. This allows maximum propelling or pushing efficiency.

Also, as the driver member 21 moves along the tube T, any residual water that is present due to minimum ice melting lubricates the tube and is swept away with the charge B to also provide for continuous cleaning. The water enters the bins 20, 25, 26 and drained through the bottom drain in a normal fashion, or a separate catch basin 106 can be provided (see FIG. 1).

Regardless of which means for reversing the differential pressure is used (FIGS. 2–2g), the driver member 21 is easily shuttled back and forth between the satellite bins 20, 25, 26 and the primary bin 12, thus greatly increasing the efficiency over prior systems. By forming a single delivery and return path for the driver member 21, the system 10 is simplified, lower in cost than predecessor systems and operates more efficiently.

In order to deliver a charge B to the intermediate satellite bin 26, shown in FIG. 1a, the transport/feed section $T_3'$ is moved or deflected to the full line position illustrated. As will be understood, the section $T_3'$ is normally in alignment with the remainder of the tube T so as to continue to the satellite bin 20, as described above. To deflect the transport/feed section $T_3'$, a cam 105 is connected to the bottom of the section $T_3'$ by a link 105a. When the cam 105 is rotated by a stepper motor 106 from the 3:00 o'clock position to the 9:00 o'clock position (the latter position as shown), the ice pieces are fed into bin 26. Similarly, a cam 107 and a stepper motor 108 can be used to deflect the transport/feed section $T_3$ by connection through a link 107a (see FIG. 1). Of course in the full line position of the transport/feed section $T_3$, the charge B of ice being delivered through the tube T simply passes through the ice dispensing machine associated with the bin 25 so that the charge can thus be delivered to the satellite bin 26, or the end satellite bin 20. While the transport/feed sections $T_3'/T_3$ are described in the above embodiment as being flexible, a suitable alternative is to simply make the sections movable by providing a ball and socket or rotary joint (not shown) at the interface with the downstream curve of the corresponding horizonal transport section $T_2'$, $T_2$. In such a case, the operation is the same except there is no flexing, but simply pivoting at the interface joint.

By establishing the above described arrangement for feeding the charge B to any one of the satellite ice dispensing machines associated with the satellite bins 20, 25, 26, through a single delivery tube T, a substantial low cost advantage is obtained over prior systems that utilize individual tubes going to separate satellite dispensing machines. In other words, by providing a single tube arrangement and connecting each of the satellite bins 20, 25, 26 in series, rather than parallel, the benefits of cost, as well as simplicity of switching arrangements, are realized. These benefits are also particularly important in operation of the cleaning cycle of the system, as will be described further below.

In order to initiate the reversal of the driver member as it travels along the delivery tube T, a series of position sensors S, $S_1$, $S_2$, $S_3$ are provided along the path (see FIGS. 1, 1a). As a preferred embodiment, the sensors $S_1$–$S_3$ are simply standard magnetic switches that are responsive to the magnetic material in the fin 33 of the driver member 21. In operation, when the driver member 21 enters the final curve of the horizontal transport section $T_2$, $T_2'$ or $T_2''$, the appropriate sensor S, $S_1$, $S_2$ can be activated to detect its presence. Once the presence is noted, then the signal is given to the propelling means 22 to reverse the differential pressure, and the driver member 21 is immediately returned to its home position.

For example, in the full line showing of the $T_3$, $T_3'$ transport feed sections of the system in FIGS. 1, 1a, the sensor S ignores the driver member 21 and allows it to continue on past the horizontal transport section $T_2'$ until it reaches the sensor $S_1$. At this position, since the bin 26 is in need of replenishment, the sensor $S_1$ causes the programmable controller (to be described below) to reverse the differential pressure through the operation of the propelling means 22. Immediately, this allows the driver member to return back past the first intermediate satellite bin 25 and all the way to the home position. The charge B of ice pieces has thereby been delivered by gravity into the bin 26.

Once this second intermediate satellite bin 26 is thus filled, the transport/feed section $T_3'$ is shifted back to the dotted line position of FIG. 1a, thereby allowing the next charge B being delivered to go to the end satellite bin 20. In such an instance, the magnetic sensor $S_2$ is activated, the charge B is delivered to the bin allowing the driver member at this point to then immediately be returned back past both the bin 26 and the bin 25 to the home position. The filling of bin 20 is shown by the dashed line depiction of the ice pieces.

Of course, it also follows that once the first intermediate satellite bin 25 has its level reduced, so as to call for additional ice, then by the operation of the controller (to be described) the transport/feed section $T_3$ can then be shifted to add ice. In this instance, the driver member 21 sees the activated sensor S, so that the charge B is released and delivered, and the driver member returns to the home position from this point.

It will be realized that with the positioning of the sensors S, $S_1$, $S_2$ as shown, as soon as the charge B of ice is released, it then continues by momentum and gravity for the delivery into a designated bin 20, 25, 26, as described. Advantageously, the driver member immediately starts its travel in the reverse direction. Since the charge B is maintained in substantially defined and composite form during its travel, the short drop through each of the transport/feed sections $T_3$, $T_3'$ into the bin is relatively gentle and breakage is minimized. There is no high velocity slamming of the ice pieces into the bin as is the usual result in prior systems. In fact, as the driver member reverses, a gentle sucking action is provided by the rapid reversal of the downstream face of the driver member 21, which action provides an assist in slowing the velocity of the pieces down as the charge B free-falls toward the bin.

In order to sense the level of ice, a flapper member 20a, 26a, 25a forms a part of each of the respective bins 20, 26, 25 (see FIGS. 1, 1a). The flapper member pivots adjacent the top and is in alignment to intercept the charge B of ice pieces as it is delivered into each of the respective bins. A corresponding sensor, such as a microswitch 95, 96, 97, is connected to the corresponding flapper members 20a, 26a, 25a to provide a signal back to the controller for determining the delivery of the charge to the desired bin.

Figure 3:
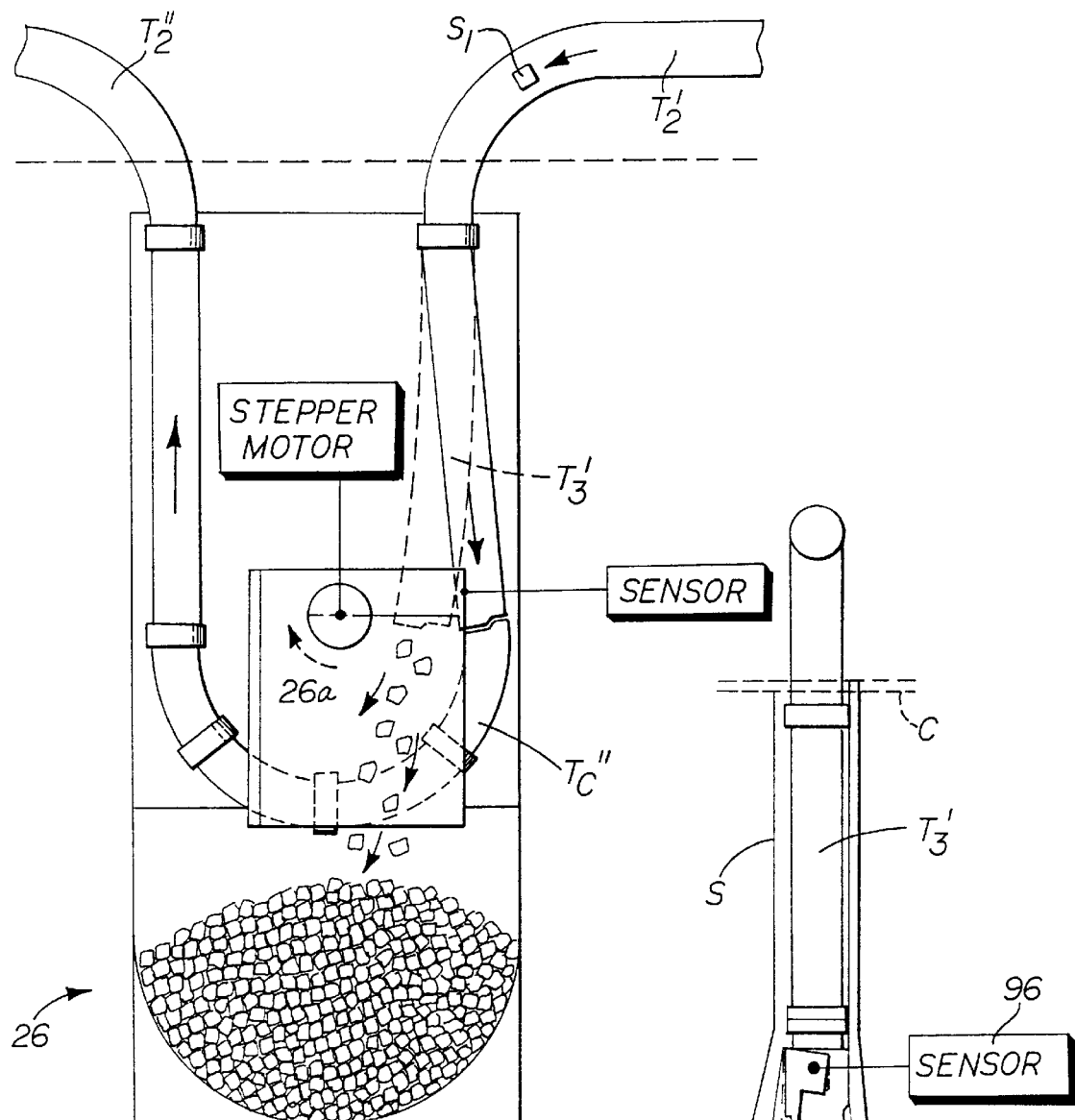
FIG. 3 is another view of the intermediate satellite bin of an ice dispenser machine illustrating the manner in which the ice is delivered against the level sensor and showing the bin only partially filled.
Figure 4:
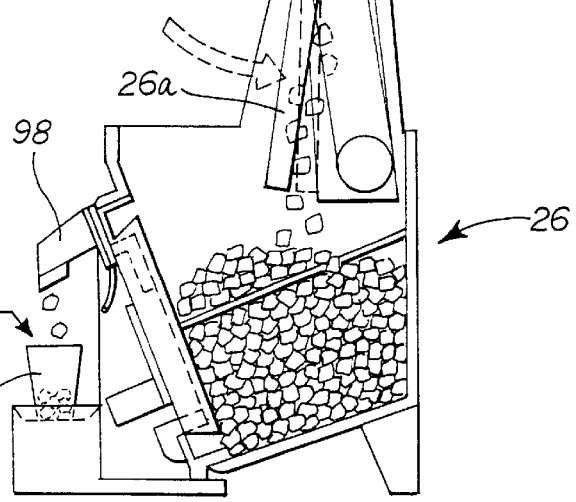
FIG. 4 is a side view of the ice dispenser machine of FIG. 3, also illustrating the filling of the intermediate satellite bin with ice.

A better understanding of the level sensing function can be obtained by viewing FIGS. 3 and 4 of the drawings. In this figure, the second intermediate satellite bin 26 is shown in more detail. The flapper member 26a is shown adjacent the exit orifice of the transport/feed section $T_3'$. As can be seen, the flapper member 26a is effective to intercept the falling charge of ice pieces and thus assists in breaking the fall and the impact of the ice pieces into the bin 26 (see in particular FIG. 4). Each time a charge of ice pieces hits the flapper member 26a, or with an assist from a rotary solenoid, it pivots outwardly as it absorbs the impact of the pieces, and then after the charge is fully within the bin the flapper member 26a returns to its downwardly depending or vertical position (note the dotted line arrow in FIG. 4). Thus, as the flapper member 26a is pivoted outwardly as each charge B arrives, it is activated to read the level of ice in the bin. If more ice is needed, the flapper member resumes its initial position. However, once the bin is full, as shown in the first intermediate satellite bin 25 (see FIG. 1), then the flapper member 26 is held at the acute angle position as illustrated and in effect provides the full signal to the controller.

If desired, in order to further reduce the impact of each charge entering a bin, a curved chute (not shown) can be interposed directly downstream of the transport/feed sections $T_3$, $T_3'$ and $T_3''$ to cause the charges B to take a curved path as they enter the respective bin. The ice pieces are forced by centrifugal force outwardly against the outside wall of the chute, and by increased friction are further slowed to better protect them from damage.

By viewing FIG. 1a and 3 together, the advantage of making the curved section $T_c''$, as well as the curved section $T_c'$, extend through approximately 190°, rather than 180°, can be seen. With this geometry, the flexing of the transport/feed sections $T_3'$ and $T_3$, respectively, moves the feed orifice toward the center of the bin 26, 25, and thus forms a centered mound within the respective bin.

As can be seen by viewing FIG. 4, the rotary dispensing wheel (not numbered) and a delivery nozzle/valve 98 of the dispensing machine for feeding ice pieces to a customer's cup D for a drink, is depicted. In the method of the present invention for dispensing an iced beverage, a beverage dispenser 99, that may be combined with the dispenser 26, provides the proportioned amount of concentrate or syrup, and carbonated water or the like, and is combined with the ice pieces, to form the beverage.

Also, the bin 26 is shown as being relatively small in terms of both depth and width to indicate the possibility of selection of a smaller machine in each instance for the satellite dispensing machines because of the increased efficiency of the distribution system 10 of the present invention. As illustrated in FIG. 4, and as will be readily apparent, the unit may now be wall mounted so as to free the dining area of counter space. As desired, the sections of the delivery tube T that extend down below the ceiling C can be enclosed by a suitable shroud S for a more desirable appearance (see FIG. 4).

Figure 5:
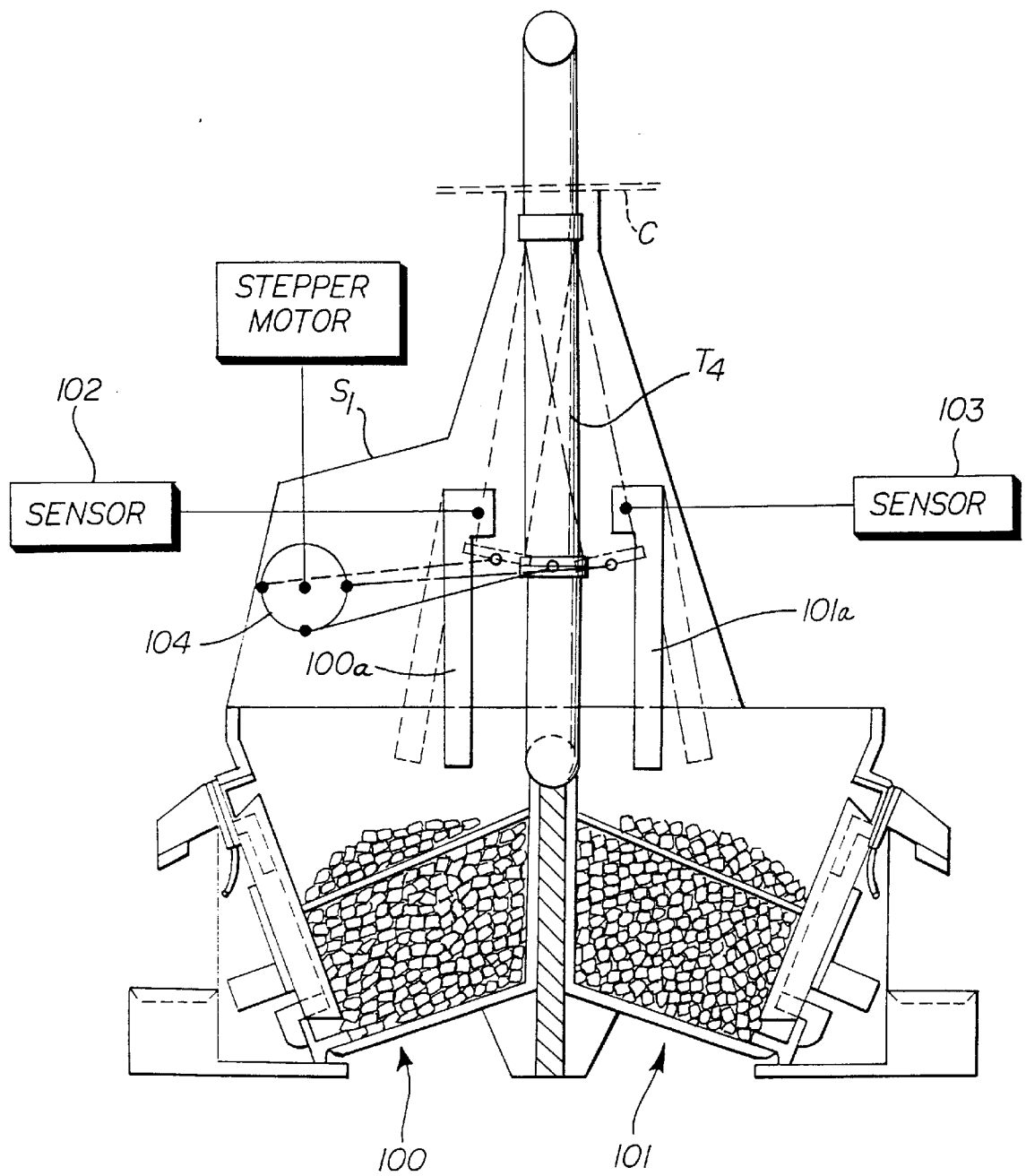
FIG. 5 is an alternative embodiment illustrating the manner in which the flexible or movable tube section of the delivery tube can be deflected in opposite directions from the continuous delivery position in order to fill two back-to-back bins.

With reference now to FIG. 5 of the drawings, an alternative arrangement of the use of satellite bins is illustrated. In this instance, two satellite ice dispensing machines are positioned back-to-back with bins 100, 101 receiving ice from a single depending transport/feed section $T_4$. As illustrated, this arrangement can be at an intermediate ice dispensing machine, or can be suitably positioned as an end satellite ice dispensing machine. All that is required is to include dual flapper members 100a, 101a along with corresponding sensors 102, 103 to form suitable level sensor assemblies. A cam 104 is oriented in a position 90° from the orientation of similar cams 105, 107 in FIGS. 1, 1a so that the transport/feed section $T_4$ can be flexed in the plane normal to that previously described. As an alternative, the joint forming the interface with the horizontal transport section of the tube T, can be a universal joint in place of making the tube section flexible. As in the previous embodiments, a suitable shroud $S_1$ can be provided.

As described above with respect to FIG. 2, the present invention makes provision for a highly efficient continuous cleaning operation by the sweeping action of the piston 21 as it moves along the tube T, both on the delivery path for ice to the satellite bins, and as said piston shuttles back to the home position of FIGS. 2, 2d and 2f. The close fitting contact, within about 1/64–1/32 inch total diametrical clearance, coupled with the lubrication and the cleaning effect of the minimal residual water from ice melting, makes the process highly efficient.

Furthermore, the present invention makes a provision for additional cleaning effect, such as may be desirable, or required by local regulations, after the system has been inoperative overnight. Specifically, at the beginning and/or end of daily work shifts, cleaning liquid, such as liquid detergent solution, or any other suitable solution, or simply extra water as a cleaner, is injected or sprayed through a nozzles (not shown) from the injector pipe(s) 58, 61 into the first end of the tube T. This is initiated at a time when there is no active delivery of ice through the tube T, or ice pieces can be used for extra scrubbing effect. In other words, a few ice pieces are inserted in front of the piston 21 on its delivery run to help distribute the solution/water around and scrub the interior of the tube T. This separate small charge of ice pieces can be inserted by programming through the controller. Of course, these ice pieces are then retrieved from the satellite hopper 20 and discarded at the end of the process.

The valve 55 (or valve 75 in the embodiment of FIGS. 2d–2g) is closed to cut off the precharge chamber 15, which of course is cleaned separately, as standards require. After injection of the sanitizing or cleaning solution, the propelling means 22 is activated to propel the driver member 21 through the entire length of the tube T past each of the intermediate satellite bins 25, 26 and all the way to the second end of the tube T at the transport/feed section $T_3''$. Once the driver member 21 is positioned opposite the position sensor $S_3$, the controller is operative to reverse the differential pressure of the propelling means 22 and immediately shuttle or return the driver member 21 back to its home position passing each of the two intermediate satellite bins 26, 25 in sequence.

In this full, two phase cleaning process using both sanitizing/cleaning liquid and rinse water, the liquid/water is expelled from the exit orifice 17 through a screen 105 (see FIG. 1a) that is positioned in satellite bin 20 on the top of a catch basin 106 with a drain 107. Thus, the cleaning liquid and rinse water can be kept away from any ice that may be remaining in the bin 20; however, a standard practice is to remove any remaining ice that has not melted and manually wipe down the bins at the same time as the full cleaning process of the system is performed.

During normal ice delivery operation, as mentioned above and as shown by the dashed line ice pieces falling across the screen 105, the bin 20 can be supplied. In this embodiment, the transport/feed section $T_3''$ does not have to be deflected in order to provide for continuous or full cleaning, as well as for normal delivery of charges of ice pieces to the bin. However, as an alternative arrangement, the catch basin 106 can be positioned outside this ice dispensing machine and the end tube section can be deflected by suitable cam, link and stepper motor (not shown).

As pointed out above, the delivery of cleaning solution through the tube can be repeated any desired number of times. Since the driver member 21 is quickly shuttled back to its home position each time in response to the position sensor $S_3$, these several cleaning operations can be quickly handled. It is an important benefit that the driver member 21 does not have to be manually retrieved from the second end of the tube and returned to the first end, as has been the practice in the past. Also, if desired, in addition to adding cleaning solution and/or water to the tube T for carrying out the process, the driver member 21 for the cleaning cycle can be a different configuration and thus specially adapted to perform its scrubbing and sweeping function in the most efficient manner.

As the second phase of the full phase cleaning operation, the second injector pipe 61 sprays a rinse water into the tube T and the driver member 21 again cycles throughout the full length of the delivery tube T, reversed at the second end by the position sensor $S_3$, and then repeated back-and-forth if necessary. of course, one advantage of having to move the driver member 21 only along a single delivery and return path, there is no delay caused by switching to separate delivery tubes arranged in parallel, as has been the practice in the past. Since the transport/feed sections $T_3$ and $T_3''$ remain at all times during the cleaning process in alignment with the remainder of the delivery tube T, the ice within the bins 20, 26, 25 is not contaminated.

Figure 6:
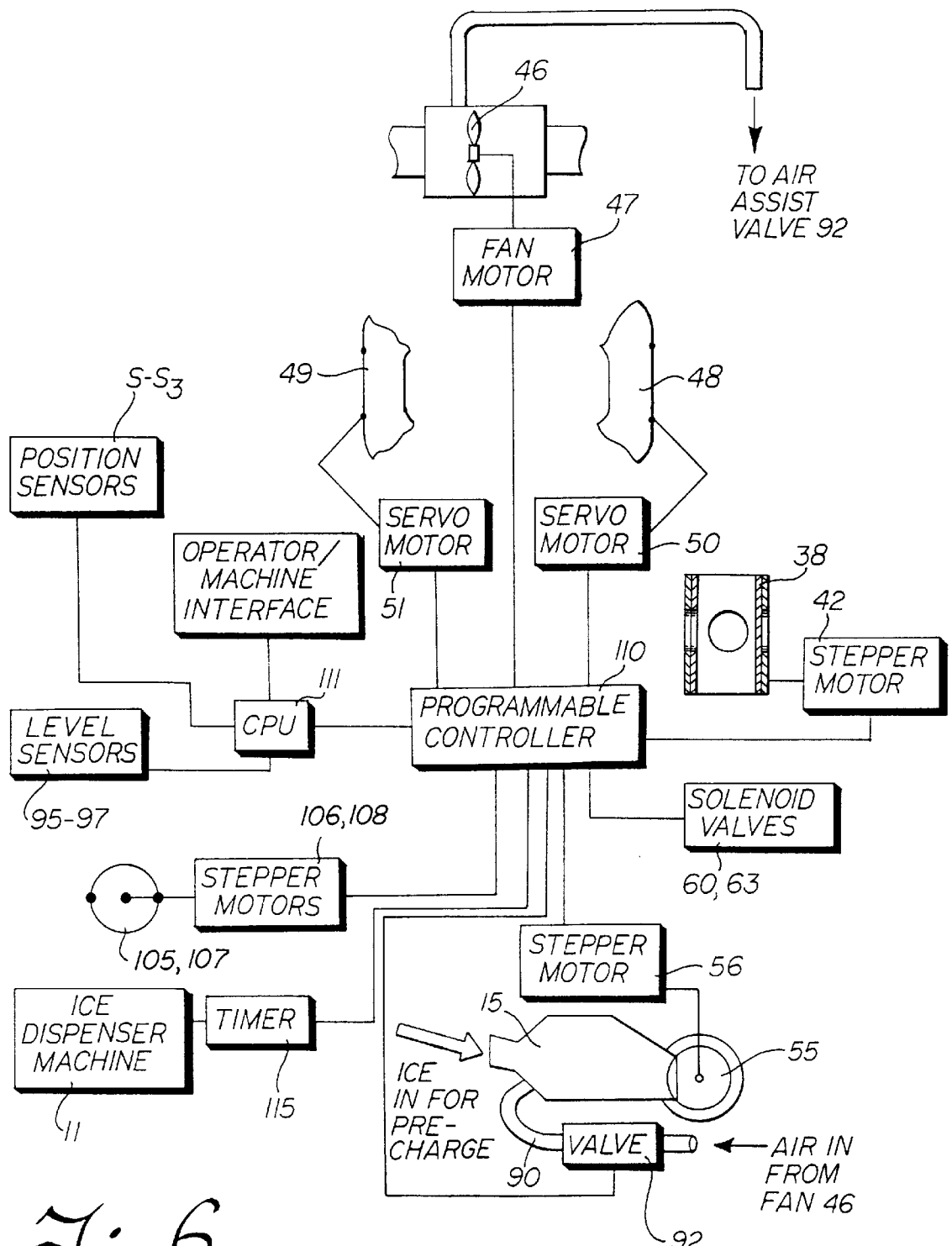
FIG. 6 is a schematic diagram of an electronic control circuit for the transportation or distribution system of the present invention.

With reference now to FIG. 6 of the drawings, a suitable electronic circuit is disclosed and will be applied to the FIGS. 2, 2a, 2b embodiment illustrated and described, including the double shift and air assist features. It is to be understood however that the operation of the circuit is basically the same when the embodiments and alternatives of FIGS. 2c–2g and FIG. 5 are employed.

Programmable controller 110, which as indicated above provides control of the various motors and solenoid valves, is shown to include a suitable CPU/computer 111 for varying the operation, and for switching from one mode or phase of the operation as required. Connected to the CPU 111 are the position sensors $S$–$S_3$. Depending upon the mode and/or phase of operation, as well as the position of level sensors 95–97, the CPU 111 allows each sensor S, $S_1$–$S_3$ to either be enabled or disabled as the driver member 21 passes. Variations in the procedure, such as the amount of ice pieces forming a charge B, can of course be inputted to the CPU 111, thus changing the particular programming of the operation. This procedure is carried out through the operator/machine interface 112. Depending on the amount of control and the sophistication of the particular system, the software routine of not only the position sensors S–$S_3$, and level sensors 95–97, can also be changed. Any other changes can be inputed through the programmable controller 110, such as to allow change in the operation and parameters of the various motors/solenoids.

To provide the operation of the propelling means 22, including reversing the differential pressure along the delivery tube T, the servo motors 50, 51 are operated, as described above. In synchronization and cooperation with the motors 50, 51, the fan motor 47 and fan 46 (or fans 70, 71) is controlled. By varying the opening of the gate valves 48, 49 by the respective motors 50, 51, and the operation of the fan motor 47 to vary the speed of the fan 46, the driver member 21 can have its speed varied, as described with respect to FIG. 2b above. As an example, this provides the ability of limiting the impact of the driver member 21 against the charge B. Furthermore, at any point along the delivery tube T, the driver member 21 can have its speed varied to carry out any other desired function in the most efficient manner.

The stepper motor 42 operates the valve member 38 in the manner desired in synchronization with the movement of the driver member 21, and of course this occurs on either the ice charge delivery cycle, or any one of the cleaning cycles. In addition, the programmable controller 110 synchronizes the operation of stepper motor 56 to operate the rotary capture valve 55.

Stepper motors 91, 93 that operate the cams 90, 92 to deflect the position of the transport/feed sections $T_3'$ and $T_3$, respectively, are also synchronized through the programmable controller 110. For the cleaning cycle, the solenoid valves 60, 63 are also controlled in a synchronized fashion by the programmable controller 110. Also, to provide the proper volume/weight of ice pieces in each charge B, the ice dispenser machine 11 can be controlled through a suitable timer 115. Of course, the amount of ice transferred into the tube T from the precharge chamber 15, can be checked in various ways, such as by employment of a level sensor along the tube T at the top of the bottom curve $T_c$.

In summary, a substantially improved ice distribution system 10, and its related method, have now been provided. The system is simple in design based on interconnecting a plurality of any number of satellite bins 20, 26, 25 in series. Advantageously, the bins are positioned along a single serpentine path defined by a single delivery tube T. Ice from a central supply at the ice dispensing machine 11 is transferred from a precharge chamber 15 on each cycle in a controlled charge B, and then delivered to any one of the selected satellite bins.

The ice pieces can start to fill the precharge chamber 15 for the next delivery cycle as soon as the driver member 21 leaves its home position on its way to one of the satellite bins 20, 25, 26. This double shifting makes maximum use of the cycle time, since a full charge, or at least a portion, is ready to enter the tube T as soon as the driver member 21 shuttles back to the home position. Also, as the charge B enters the tube T, it is advantageously not isolated from the pressurized air for this short time. The air assist nozzle 90 ejects a stream into the precharge chamber to not only rapidly move the charge B into the tube T, but also to prevent any tendency for freeze up and blockage.

Of substantial importance, the charge B of ice pieces after being transferred into the tube T, is transported to one of the satellite bins 20, 25, 26 without being subjected to a high pressure/high velocity conveying medium, as has caused problems in the past in terms of breakage, melting and undesirable levels of noise. As each charge is delivered to the respective bin, the driver member 21 releases the charge immediately above the bin to allow the short free-fall by gravity and momentum, and onto the mound of ice. Each of the sensors S–$S_3$ forms an important function of allowing the driver member 21 to be immediately reversed and returned at relatively high speed back along the same path to its home position in readiness for the next cycle.

The continuous and full cleaning operations depend on the sweeping action of the driver member 21 as it moves back-and-forth along the tube T. In the full, two phase cleaning mode, the cleaning liquid/rinse water is sequentially injected through the injector pipes 58, 61, and the driver member 21 acts to spread the liquid in the tube and perform a very efficient scrubbing and sweeping action along the tube's full length. When the sensor $S_3$ is reached adjacent the second end of the tube T, the driver member 21 continues its cleaning function as it automatically returns to the home position. As will be realized, this advantageous cleaning concept can be applied to any similar ice piece transportation system.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A transportation system for repeated delivering of charges of ice pieces and residual water from minimum melted ice to a remote location for use of said ice pieces, comprising:

a primary bin for holding a supply of ice pieces;

a transport tube communicating adjacent a first end with said primary bin;

a dispenser for delivering a charge of ice pieces to the tube from said primary bin;

a satellite bin communicating with said tube adjacent a second end for receiving said charge of ice pieces at the remote location;

a piston closely fitting inside said tube to engage behind said charge of ice pieces for moving said pieces along said tube toward said satellite bin;

said piston lubricating said tube with said residual water to reduce the friction during movement along said tube; and a pair of blowers to provide differential air pressure for propelling said piston along said tube for controlled delivery of said pieces to the satellite bin adjacent said second end of said tube while isolating the pieces from significant upstream air flow and stress, said piston moving along said tube with a high pressure on the upstream face and a low pressure on the downstream face that engages the trailing end of said charge;

whereby said ice pieces can be efficiently and rapidly transferred to said satellite bin in a substantially defined charge while minimizing melting and breakage.

2. The transportation system of claim 1, wherein is further provided means for reversing said differential pressure to shuttle said piston back-and-forth between the bins to form a single delivery and return path.

3. The transportation system of claim 2, wherein is further provided:

at least one intermediate satellite bin;

a movable section in said tube adjacent said intermediate satellite bin;

said section normally being in alignment with said transport tube continuing to said second end and said satellite bin to allow said driver member to shuttle along substantially the full length of said transport tube; and means to temporarily shift said tube section to a second position to discharge said charge into said intermediate satellite bin, whereby the system includes at least two satellite bins connected in series.

4. The transportation system of claim 3, wherein said piston is sufficiently close fitting in said tube to provide both lubrication and continuous cleaning by sweeping said residual water along said tube.

5. The transportation system of claim 4, wherein is provided a first injector means for sanitizing fluid adjacent said first end in front of said piston and a second injector for rinse water in the same location, said piston serving to sweep said fluid from said first end to said second end, whereby two phase cleaning may be provided.

6. The transportation system of claim 5, wherein is provided a catch basin adjacent said second end for receipt of said residual water/cleaning fluid/rinse water; and a screen positioned at an angle below the exit orifice of said tube to deflect said ice pieces into said satellite bin during ice transportation while allowing passage of said residual water/sanitizing fluid/rinse water to said catch basin during ice transportation/two phase cleaning.

7. The transportation system of claim 2, wherein said reversing means includes a position sensor responsive to said piston and positioned upstream of said second end, whereby said piston is reversed prior to reaching said satellite bin while allowing said charge of ice pieces to continue into said bin.

8. The transportation system of claim 7, wherein is further provided:

an ice supply level sensor associated with said satellite bin to interrupt the operation of said dispenser and said pair of blowers upon being filled.

9. The transportation system of claim 8, wherein is further provided:

a controller for operating said dispenser, said pair of blowers and reversing means, and for monitoring and changing the operation parameters of said system.

10. The transportation system of claim 9, wherein is further provided:

at least one intermediate satellite bin including a second level sensor;

said controller being operative to switch the delivery of said charge of ice pieces from said satellite bin to/from said intermediate satellite bin in response to said level sensors.

11. The transportation system of claim 1, wherein is further provided:

means for varying the differential pressure of said pair of blowers to control the movement of said piston;

a controller for operating said dispenser, said pair of blowers, and said varying means, and for monitoring and changing the operation parameters of said system, whereby the operation parameters including the velocity of said piston may be controlled for optimum operation.

12. The transportation system of claim 1, said pair of blowers including first and second fans, said first fan being operative to establish said differential pressure along the delivery path for said ice pieces; and said second fan being operative to establish the differential air pressure along the return path, whereby the air flow generated by each fan is mutually exclusive.

13. The transportation system of claim 12, wherein is provided:

means for varying the differential pressure of said pair of blowers to control the movement of said piston;

a controller for operating said dispenser, pair of blowers, and said varying means, and for monitoring and changing the operation parameters of said system;

said controller being operative for switching said fans for reversing said differential pressure to shuttle said piston back-and-forth between the bins.

14. The transportation system of claim 13, wherein is further provided:

injector means for sanitizing fluid adjacent said first end of said tube and positioned in front of the downstream face of said piston while in the home position; and said reversing means including a position sensor for the cleaning cycle adjacent said second end of said tube, whereby full cleaning along substantially the full length of said tube is provided.

15. The transportation system of claim 1, wherein is provided:

a precharge chamber upstream of said transport tube to receive said ice pieces from said dispenser to form at least a portion of said charge during delivery of the previous charge to said bin.

16. The transportation system of claim 15, wherein is provided a nozzle opening in said precharge chamber on the upstream side to provide differential air pressure from said pair of blowers in the form of an air stream for an air assist for said charge moving into said transport tube.

17. A method of transporting ice pieces and residual water from minimum melted ice through a transport tube to a satellite bin at a remote location for use of said ice pieces, comprising:

supplying a charge of ice pieces to said transport tube adjacent a first end;

engaging the trailing end of said charge by a downstream face of a driver member; and propelling the driver member along said tube by establishing a differential air pressure across said driver member with a high pressure on the upstream face and a low pressure on the downstream face that engages the trailing end of said charge, the differential air pressure being sufficient to propel said driver member for delivery of said charge to the satellite bin adjacent a second end of said tube while maintaining said ice pieces substantially out of contact with the high pressure air and isolating the pieces from significant stress;

lubricating said driver member with said residual water to reduce the friction during movement along said tube;

establishing an average first velocity for the charge during the propelling step to minimize breakage and melting; and reversing the differential air pressure before the driver member reaches a second end of said transport tube to establish a second average velocity to automatically shuttle the driver member back to the home position adjacent the first end, said second average velocity being higher than the first average velocity, whereby said ice pieces can be efficiently and rapidly transported to said satellite bin in a substantially defined charge while minimizing melting and breakage.

18. A method of continuously cleaning an ice transportation system having a transport tube comprising:

supplying a charge of ice pieces to a transport tube adjacent a first end;

propelling the charge of ice pieces through the transport tube with a driver member from the first end to a second end by differential air pressure;

maintaining the charge of ice pieces in substantially close contact on the low pressure side of the driver member traveling through the transport tube, while at the same time maintaining said charge substantially out of contact with and insulated from the high pressure side, whereby the melting effect of the pressurized air on the ice pieces is minimized; and injecting sanitizing fluid into said transport tube on the downstream side of said driver member adjacent said first end;

maintaining said driver member in sufficiently close fitting contact in said tube to provide both lubrication and continuous cleaning by sweeping said residual water and sanitizing fluid along said tube;

propelling the driver member through the transport tube with differential air pressure so as to sweep the sanitizing fluid through the transport tube toward the second end;

reversing the differential pressure to shuttle said driver member back and forth between the ends; and dumping the sanitizing fluid from the transport tube.

19. The method of cleaning of claim 18, further comprising:

injecting a rinse fluid in the transport tube adjacent said first end after dumping said sanitizing fluid;

propelling the driver member along the transport tube by the differential air pressure with the rinse water;

reversing the differential pressure to shuttle said driver member back and forth between the ends of the tube; and dumping the rinse water from the transport tube, whereby the tube is continuously cleaned, and selectively sanitized and rinsed.

20. A system for transporting a charge of ice pieces from a home position to a plurality of remote locations comprising:

a primary bin for holding a supply of ice pieces adjacent said home position;

agitation means to prevent ice blockage of said ice pieces in said primary storage bin;

a transport tube communicating between said primary storage means and said remote locations;

a dispenser for transferring a charge of ice pieces from said primary bin to said tube;

pneumatic means for providing differential air pressure in said tube;

a driver member to engage behind said charge to insulate said charge of ice during transport through said tube by said differential air pressure, thereby minimizing the melting effect of the pressurized air on said ice pieces;

at least one satellite bin at each said remote location for receiving said charge of ice;

means for reversing said differential air pressure to shuttle said driver member back-and-forth between said home position and said remote locations;

a controller for selecting the satellite bin for receiving said charge of ice pieces, a precharge chamber between said primary bin and said transport tube to receive said ice pieces from said dispenser to form at least a portion of said charge during delivery of a previous charge to the selected bin; and a nozzle opening in said precharge chamber on the upstream side to provide differential air pressure from said pneumatic means in the form of an air stream for an air assist for said charge moving into said transport tube, whereby said ice pieces can be selectively and rapidly transported to said remote locations while minimizing melting and breakage.

21. A transportation system for repeated delivering of charges of ice pieces and residual water from minimum melted ice to a remote location for use of said ice pieces, comprising:

a primary bin for holding a supply of ice pieces;

a transport tube communicating adjacent a first end with said bin;

a dispenser for delivering a charge of ice pieces to the tube from said primary bin;

a satellite bin communicating with said tube adjacent a second end for receiving said charge of ice pieces at the remote location;

a driver member to engage behind said charge of ice pieces for moving said pieces along said tube toward said satellite bin;

said driver member lubricating said tube with said residual water to reduce the friction during movement along said tube; and pneumatic means to provide differential air pressure for propelling said driver member along said tube for controlled delivery of said pieces to the satellite bin adjacent said second end of said tube while isolating the pieces from significant upstream air flow and stress;

means for varying the differential pressure of said pneumatic means to control the movement of said driver member;

a controller for operating said dispenser, pneumatic means, and said varying means, and for monitoring and changing the operational parameters of said system, whereby said ice pieces can be efficiently and rapidly transferred to said satellite bin in a substantially defined charge while minimizing melting and breakage.

22. A transportation system for repeated delivering of charges of ice pieces and residual water from minimum melted ice to a remote location for use of said ice pieces, comprising:

a primary bin for holding a supply of ice pieces;

a transport tube communicating adjacent a first end with said bin;

a dispenser for delivering a charge of ice pieces to the tube from said primary bin;

a satellite bin communicating with said tube adjacent a second end for receiving said charge of ice pieces at the remote location;

a driver member to engage behind said charge of ice pieces for moving said pieces along said tube toward said satellite bin;

said driver member lubricating said tube with said residual water to reduce the friction during movement along said tube; and pneumatic means to provide differential air pressure for propelling said driver member along said tube for controlled delivery of said pieces to the satellite bin adjacent said second end of said tube while isolating the pieces from significant upstream air flow and stress;

a precharge chamber upstream of said transport tube to receive said ice pieces from said dispenser to form at least a portion of said charge during delivery of a previous charge to said bin, whereby said ice pieces can be efficiently and rapidly transferred to said satellite bin in a substantially defined charge while minimizing melting and breakage.

23. The transportation system of claim 22, wherein is provided a nozzle opening in said precharge chamber on the upstream side to provide differential air pressure from said pneumatic means in the form of an air stream for an air assist for said charge moving into said transport tube.

* * * * *